US007691244B2

(12) United States Patent
Levitan et al.

(10) Patent No.: US 7,691,244 B2
(45) **Date of Patent: *Apr. 6, 2010**

(54) MICROFLUIDIC PUMPS AND MIXERS DRIVEN BY INDUCED-CHARGE ELECTRO-OSMOSIS

(75) Inventors: Jeremy Levitan, Cambridge, MA (US); Martin Z. Bazant, Winchester, MA (US); Martin Schmidt, Reading, MA (US); Todd Thorsen, Arlington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 86 days.

This patent is subject to a terminal disclaimer.

(21) Appl. No.: 11/252,871

(22) Filed: Oct. 19, 2005

(65) Prior Publication Data

US 2007/0240989 A1 Oct. 18, 2007

Related U.S. Application Data

(63) Continuation-in-part of application No. 10/319,949, filed on Dec. 16, 2002, now Pat. No. 7,081,189.

(60) Provisional application No. 60/341,777, filed on Dec. 18, 2001, provisional application No. 60/620,000, filed on Oct. 19, 2004.

(51) Int. Cl.
*G01N 27/453* (2006.01)
*G01N 27/447* (2006.01)

(52) U.S. Cl. ....................... 204/450; 204/601; 204/600; 204/451

(58) Field of Classification Search ......... 204/450–455, 204/600–605
See application file for complete search history.

(56) References Cited

U.S. PATENT DOCUMENTS

| | | | | |
|---|---|---|---|---|
| 4,908,112 | A * | 3/1990 | Pace | 210/198.2 |
| 5,092,972 | A | 3/1992 | Ghowsi et al. | |
| 5,324,413 | A | 6/1994 | Gordon | |
| 5,593,565 | A * | 1/1997 | Ajdari et al. | 204/643 |
| 5,660,703 | A | 8/1997 | Dasgupta et al. | |
| 5,985,119 | A | 11/1999 | Zanzucci et al. | |
| 6,042,709 | A | 3/2000 | Parce et al. | |

(Continued)

FOREIGN PATENT DOCUMENTS

WO WO 00/55502 9/2000

(Continued)

OTHER PUBLICATIONS

Ajdari (2000) "Pumping liquids using asymmetric electrode arrays." Physical Review E Rapid Communications vol. 61 No. 1: 45-48.

(Continued)

*Primary Examiner*—Alex Noguerola
(74) *Attorney, Agent, or Firm*—Pearl Cohen Zedek Latzer, LLP; Mark Cohen

(57) ABSTRACT

This invention provides devices and apparatuses comprising the same, for the mixing and pumping of relatively small volumes of fluid. Such devices utilize nonlinear electrokinetics as a primary mechanism for driving fluid flow. Methods of cellular analysis and high-throughput, multi-step product formation using, devices of this invention are described.

82 Claims, 9 Drawing Sheets

U.S. PATENT DOCUMENTS

| | | | | |
|---|---|---|---|---|
| 6,068,752 | A * | 5/2000 | Dubrow et al. | 204/604 |
| 6,086,243 | A * | 7/2000 | Paul et al. | 366/273 |
| 6,086,572 | A | 7/2000 | Johnson et al. | |
| 6,132,580 | A * | 10/2000 | Mathies et al. | 204/453 |
| 6,264,825 | B1 * | 7/2001 | Blackburn et al. | 205/777.5 |
| 6,318,970 | B1 | 11/2001 | Backhouse | |
| 6,379,974 | B1 | 4/2002 | Parce et al. | |
| 6,394,759 | B1 | 5/2002 | Parce et al. | |
| 6,447,727 | B1 | 9/2002 | Parce et al. | |
| 6,465,257 | B1 | 10/2002 | Parce et al. | |
| 6,508,273 | B1 | 1/2003 | Van Den Berg et al. | |
| 6,660,147 | B1 * | 12/2003 | Woudenberg et al. | 204/455 |
| 6,685,809 | B1 * | 2/2004 | Jacobson et al. | 204/450 |
| 6,805,783 | B2 * | 10/2004 | Ohkawa | 204/454 |
| 6,890,411 | B1 | 5/2005 | Hayes et al. | |
| 6,942,771 | B1 * | 9/2005 | Kayyem | 204/409 |
| 7,063,778 | B2 | 6/2006 | Mpholo et al. | |
| 7,081,189 | B2 * | 7/2006 | Squires et al. | 204/451 |
| 2003/0016429 | A1 | 1/2003 | Ikeda et al. | |
| 2003/0164296 | A1 | 9/2003 | Squires et al. | |
| 2005/0129526 | A1 | 6/2005 | Dukhin et al. | |

FOREIGN PATENT DOCUMENTS

| | | |
|---|---|---|
| WO | WO 01/94635 | 12/2001 |

OTHER PUBLICATIONS

Ajdari (2002) "Electrokinetic 'ratchet' pumps for microfluids." Applied Physics 75, 271-274.

Bazant, et al (2004) "Induced-Charge Electrokinetic Phenomona: Theory and Microfluidic Applications." Physical Review Letters vol. 92 No. 6: 066101-1-066104.

Brown, et al (2000) "Pumping of water with ac electric fields applied to asymmetric pairs of microelectrodes." Physical Review E vol. 63, 016305-1-016305-8.

Cahill, et al (2004) "Electro-osmotic streaming application of traveling-wave electric fields." Physical Review E vol. 70, 013605-1-013605-8.

Debesset, et al (2004) "An AC electro-osmotic micro-pump for circular chromatographic applications." Lap Chip, 4, 396-400.

Gonzalez, et al (2000) "Fluid flow induced by non-uniform ac electric fields in electrolytes on microelectrodes." Physical Review E vol. 61 No. 4: 4019-4028.

Green, et al (2000) "Ac electrokinetics: a survey of sub-micrometre particle dynamics." J. Phys. D: Appl. Phys. Physical Review E vol. 33, 632-641.

Green, et al (2000) "Electric field induced fluid flow on microelectrodes: the effect of illumination." J. Phys. D: Appl. Phys. vol. 33, L13-L17.

Green, et al (2000) "Fluid flow induced by non-uniform ac electric fields in electrolytes on microelectrodes." Physical Review E vol. 61 4011-4018.

Green, et al (2002) "Fluid flow induced by nonuniform ac electric fields in electrolytes on microelectrodes. III. Observation of streamlines and numerical simulation." Physical Review E vol. 66, 026305-1-026305-11.

Levitan, et al (2005) "Experimental observation of induced-charge elctro-osmosis around a metal wire in a microchannel." Physiochem. Eng. Aspects. Physical Review E vol. 267: 122-132.

Meinhart, et al (2003) "Measurement of AC Electrokinetic Flows." Biomedical Microdevices, vol. 5, 139-145.

Mpholo, et al (2003) "Low voltage plug flow pumping using anisotropic electrode arrays." Sensors and Actuators, vol. 92: 262-268.

Ramos, et al (2003) "Pumping of liquids with ac voltages applied to asymmetric pairs of microelectrodes." Physical Review E , vol. 67: 056302-1-056302-11.

Ramos, et al (1999) "AC Electric-Field-Induced Fluid Flow in Microelectrodes." Journal of Colloid and Interface Science, vol. 217: 420-422.

Ramos, et al (2005) "Pumping of liquids with traveling-wave electroosmosis." Journal of Applied Physics, vol. 97: 084906-1-084906-8.

Sigurdson, et al (2005) "Electrothermal stirring for heterogeneous immunoassays." Lab Chip, vol. 5: 1366-1373.

Squires, et al (2004) "Induced-charge electro-osmosis." J. Fluid Mech. vol. 509: 217-252.

Squires, et al (2006) "Breaking symmetries in ICEO" Journal of Fluid Mechanis vol. 560, 65-101.

Squires, et al (2005) "Microfluidics: Fluid Physics at the Nanoliter Scale." Department of Reviews of Modern Pysics vol. 7:3 pp. 977-1026.

Stone, et al (2004) "Engineering Flows in Small Devices: Microfluidics Toward a Lab-on-a-Chip." Annu. Rev. Fluid Mech., vol. 36: 381-411.

Studer, et al (2002) "Fabrication of microfluidic devices for AC electrokinetic fluid pumping." Microelectronic Engineering, vol. 61-62: 915-920.

Studar, et al (2004) "An integrated AC electrokinetic pump in a microfluidic loop for fast and tunable flow control." Analyst, vol. 129: 944-949.

Wong, et al (2004) "Electrokinetics in Micro Devices for Biotechnology Applications." Transactions on Mechatronics, vol. 9, No. 2, 366-376.

Wong, et al (2004) "Electrokinetic Bioprocessor for Concentrating Cells and Molecules." Anal. Chem. 76, 6908-6914.

Wu, et al (2005) "Particle detection by electrical impedance spectroscopy with asymmetric polarization AC electroosmotic trapping." Microfluid Nanofluid, vol. 1: 161-167.

* cited by examiner

MICROFLUIDIC PUMPS AND MIXERS DRIVEN BY INDUCED-CHARGE ELECTRO-OSMOSIS

CROSS REFERENCE TO RELATED APPLICATIONS

This application is a Continuation-In-Part of U.S. application Ser. No. 10/319,949, filed on Dec. 16, 2002now U.S. Pat. No. 7,081,189, which claims priority from U.S. Provisional Application Ser. No. 60/341,777 filed on Dec. 18, 2001; and claims the benefit of U.S. Provisional Application Ser. No. 60/620,000, filed Oct. 19, 2004 which are incorporated in their entirety herein by reference.

GOVERNMENT SUPPORT

This invention was made with U.S. Government support under Grant Number DAAD-19-02-002, awarded by US Army Research Office. The government has certain rights in the invention.

BACKGROUND OF THE INVENTION

The invention relates to the fields of microfluidics, micro-total-analysis systems (μTAS) and micro-electro-mechanical systems (MEMS), in particular microfluidic pumps and mixers driven by induced-charge electro-osmosis.

The ability to transport fluids in micron-sized channels is essential for many emerging technologies, such as in vivo drug delivery devices, micro-electro-mechanical systems (MEMS), and micro-total-analysis systems (μTAS). New methods for the rapid mixing of non-homogeneous fluids in micron-scale devices are also required, since the absence of turbulent mixing on these small length scales implies that mixing occurs by molecular diffusion alone. This typically takes from seconds to minutes—far too slow for envisioned applications. New technologies are thus required for the manipulation, transport and mixing of fluids on these small length scales.

Although MEMS-based mechanical pumps with moving parts have recently been developed, including peristaltic pumps, a variety of non-mechanical pumping strategies without moving parts have been used, e.g. based on electrical fields, thermal gradient, electrochemical reactions, surface-tensions gradients, and patterned surfaces. Non-mechanical strategies for fluid manipulation become more efficient at very small scales because they are driven by surface phenomena. Moreover, they can be much cheaper to implement than mechanical MEMS-based strategies because they take advantage of nano-scale chemical effects already exhibited by many fluids used in biomedical and chemical engineering applications. They can also possess fewer parts, and are better suited for flexible devices, such as microfluidic fibers.

A popular non-mechanical fluid manipulation strategy is based on the phenomena of electro-osmosis, i.e. the fluid slip at a solid-electrolyte interface induced by a tangential electric field. The fluid is set into motion by strong electrostatic body forces exerted by excess ionic charge in diffuse boundary layers of thickness λ=1-100 nm near a solid interface. This effect, which has been studied extensively for more than a century in colloidal science and electrochemistry, is well suited for biomedical applications because the majority of bodily fluids, such as blood or lymph, are electrolytes with comparable ionic strengths. Moreover, the working electrode imposing spatially or temporally varying electric fields can be easily and cheaply built into microchannels with existing silicon-based micro-fabrication technology Driving fluids with electric fields also facilitates integration with logic circuits for sensing and integration microfluidic devices.

The simplest electro-osmotic pumping technique is based on applying a DC field tangential to a solid channel surface, presumed to have a uniform equilibrium zeta potential ζ or diffuse charge density q. In this case, the fluid-solid surface develops a 'slip velocity' given by the classical Helmlioltz-Smoluchowski formula defined as:

$$\vec{\mu_1} = \left(\frac{-\varepsilon\varepsilon_o\zeta}{\eta}\right)\vec{E_\parallel} = \left(\frac{q\lambda}{\eta}\right)\vec{E_\parallel} \quad \text{EQ 1}$$

with a prescribed ζ or q, where $\delta_0$ is the permissivity of vacuum, and E and η represent the dielectric constant and viscosity of the electrolytic fluid.

In spite of its appealing simplicity, however, there are several drawbacks to the use of DC electric fields, related to the fact that a steady current (J=σE) must exit in order to maintain a steady field because every electrolyte has a non-negligible bulk conductivity. A steady current in turn implies the creation of ions at one electrode and removal of ions at the other via electrochemical reactions. This can cause a variety of problems. For example, the dissolution of the anode eventually destroys the electric circuit, causing irreversible failure. Microfluidic devices employing DC electric fields thus typically have short lifetimes, which can be acceptable in some applications, such as one-time drug delivery, but not in others, such as μTAS. A shorter lifetime also translates into a higher cost per unit of time of operation. The dissolution of the anode also injects metallic ions into the fluid, which can present safety hazards in biomedical applications or can interfere with chemical reactions in μTAS. Also, the depositions of ions at the cathode can lead to unstable deposits, which can break off or otherwise interfere with the bulk fluid. Furthermore, electrochemical reactions at electrodes inevitably cause electrolyte concentration gradients, which create complicated and potentially unwanted secondary bulk electric fields, as well as secondary electrokinetic phenomena at surfaces.

These problems can be solved using high-frequency AC fields, which can be safer, more reliable and more durable than using DC fields. Because AC fields are typically applied along closely spaced electrode arrays, much smaller voltages are required to achieve strong electric fields. Furthermore, the change in electrode polarity frustrates electrochemical reactions, helping avoid unwanted electrolysis reactions at the electrodes.

Since the fluid slip velocity of standard electro-osmosis used in EQ. 1 is linear in the applied field E, it averages to zero in an AC field. Therefore, different phenomena must be used is to drive steady microfluidic flows using AC fields. For example, AC traveling waves on electrode arrays have been used to drive flows by coupling to thermal gradients. A pair of electrodes adjacently located on a glass slide, to which an AC voltage is applied, has recently been shown to drive a steady swirling flow, and a stationary AC wave on a locally asymmetric electrode array has been shown to pump fluid. Both of these applications work in a limited range of frequencies and rely on a subtle form of electro-osmosis involving induced charges on the electrodes. The electro-osmotic flow is driven by transient interactions between the high-frequency field and the self-induced changes in the diffuse-layer charge density along the electrode surfaces. The pumping effect is therefore a strictly non-equilibrium phenomenon which violates the ubiquitous assumption of a constant zeta potential underlying the classical theory of electro-osmosis.

Although the available pumping techniques based on AC electric fields offer various advantages over DC methods, there are still serious drawbacks. Foremost among these is the need to microfabricate complex patterned-surface electrodes with elaborate micro-circuitry, which can be more costly, difficult, and prone to failure than their very simple DC counterparts. Another potential drawback is that patterned-surface devices are "hard-wired" into the electrical circuitry and the physical structure of the surface itself, rendering them less versatile.

SUMMARY OF THE INVENTION

In one embodiment, this invention provides a microfluidic device comprising two or more inlet ports, at least one outlet port and microfluidic channels in fluid communication with said ports, said channels comprising one or more micropumps, one or more micromixers, or a combination thereof, wherein:

said micropumps comprise a passageway for transmitting an electrolyte fluid; a source providing an electric field in said microchannel; at least one conductor element in an orientation that is perpendicular to the axis of said electric field, at a location within or proximal to said microchannel, whereby interactions between said electric field and said at least one conductor element produce electro-osmotic flows so that said electrolyte fluid is driven across said microfluidic channels; and said micromixers comprise a passageway for transmitting an electrolyte fluid; a source providing an electric field in said microfluidic channels; at least one conductor element in an orientation that is perpendicular to the axis of said electric field, at a location within or proximal to said microchannel, whereby interactions between said electric field and each conductor element produce electro-osmotic flows with varied trajectories, and said electrolyte fluid is driven across said microfluidic channels so that said electrolyte fluid is mixed in said microfluidic channels.

In one embodiment, the electric field is comprised of a DC electric field, or in another embodiment, the electric field is comprised of an AC or pulsed AC electric field In one embodiment, the field source is comprised of electrodes of different polarities. In one embodiment, the conductor element is comprised of a symmetric cylinder of a defined radius. In one embodiment, the conductor element is comprised of an asymmetric conductor element, with either non-uniform surface composition or non-circular cross section. In one embodiment, the conductor element is comprised of a conducting strip. In one embodiment, the wall of the microfluidic channels comprises the conducting strip.

In one embodiment, the microfluidic channels form a cross-junction, or in another embodiment, an elbow-junction, or in another embodiment, a T-junction, or in another embodiment, a Y-junction.

In one embodiment, conductor element is comprised of a symmetric conductor element. In another embodiment, the microfluidic channels are comprised of a transparent material, or in another embodiment, a metal, which, in one embodiment, is a metal bi-layer.

In another embodiment, this invention provides an apparatus comprising a device of this invention.

In another embodiment, this invention provides a method of cellular analysis, comprising the steps of:

a. introducing a buffered suspension comprising cells to a first inlet port of a microfluidic device;
b. introducing a reagent for cellular analysis to said first inlet port or a second inlet port of said microfluidic device, said microfluidic device comprising:
   i. one or more inlet ports, at least one outlet port and microfluidic channels in fluid communication with said ports, said channels comprising one or more micropumps, one or more micromixers, or a combination thereof, wherein:

said micropumps comprise a passageway for transmitting said suspension and said reagent; a source providing an electric field in said microchannel; at least one conductor element in an orientation that is perpendicular to the axis of said electric field, at a location within or proximal to said microchannel, whereby interactions between said electric field and said at least one conductor element produce electro-osmotic flows so that said suspension and said reagent are driven across said microfluidic channels; and said micromixers comprise a passageway for transmitting said suspension and said reagent; a source providing an electric field in said microfluidic channels; at least one conductor element in an orientation that is perpendicular to the axis of said electric field, at a location within or proximal to said microchannel, whereby interactions between said electric field and said conductor element produce electro-osmotic flows with varied trajectories, and said suspension and said reagent are driven across said microfluidic channels so that said suspension and said reagent are mixed in said microfluidic channels; and
c. analyzing at least one parameter affected by contact between said suspension and said reagent.

In one embodiment, the reagent is an antibody, a nucleic acid, an enzyme, a substrate, a ligand, or a combination thereof. In another embodiment, the reagent is coupled to a detectable marker, which in another embodiment is a fluorescent compound. In another embodiment, the device is coupled to a fluorimeter or fluorescent microscope. In another embodiment, the device is comprised of a transparent material.

In another embodiment, the method further comprises the step of introducing a cellular lysis agent in an inlet port of said device. According to this aspect of the invention, and in one embodiment, the reagent specifically interacts or detects an intracellular compound.

In another embodiment, this invention provides a method of high-throughput, multi-step product formation, the method comprising the steps of:

a. introducing a first liquid comprising a precursor to a first inlet port of a microfluidic device;
b. introducing a second liquid comprising a reagent, catalyst, reactant, cofactor, or combination thereof to said first inlet port or a second inlet port of said microfluidic device, said microfluidic device comprising:
   i. one or more inlet ports, at least one outlet port and microfluidic channels in fluid communication with said ports, said channels comprising one or more micropumps, one or more micromixers, or a combination thereof, wherein:

said micropumps comprise a passageway for transmitting said suspension and said reagent; a source providing a electric field in said microchannel; at least one conductor element that is placed in an orientation that is perpendicular to the axis of said electric field, at a location within or proximal to said microchannel, whereby interactions between said electric field and said at least one conductor element produce electro-osmotic flows so that said first liquid and said second liquid are driven across said microfluidic channels; and said micromixers comprise a passageway for transmitting said suspension and said reagent; a source providing a electric field in said microfluidic channels; at least one conductor element that is placed in an orientation that is perpendicular to the axis of said electric field, at a location within or proximal to said microchannel, whereby interactions between said electric field and each conductor element produce electro-osmotic flows with varied trajectories, and said first liquid and said second liquid are driven across said microfluidic channels so that said first liquid and said second liquid are mixed in said microfluidic channels; and c. collecting said mixed liquid formed from an outlet port of said device.

In one embodiment, the method further comprises the step of carrying out iterative introductions of said second liquid, as in (b), to additional inlet ports. In one embodiment, the reagent is an antibody, a nucleic acid, an enzyme, a substrate, a ligand, a reactant or a combination thereof.

In another embodiment, this invention provides a method of drug processing and delivery, the method comprising the steps of:

a. introducing a first liquid comprising a drug to a first inlet port of a microfluidic device;

b. introducing a second liquid comprising a buffer, a catalyst, or combination thereof to said first inlet port or to a second inlet port of said microfluidic device, said microfluidic device comprising:

i. two or more inlet ports, at least one outlet port and microfluidic channels in fluid communication with said ports, said channels comprising one or more micropumps, one or more micromixers, or a combination thereof, wherein:

said micropumps comprise a passageway for transmitting said first and said second liquids; a source providing a electric field in said microchannel; at least one conductor element that is placed in an orientation that is perpendicular to the axis of said electric field, at a location within or proximal to said microchannel, whereby interactions between said electric field and said at least one conductor element produce electro-osmotic flows so that said first liquid and said second liquid are driven across said microfluidic channels; and said micromixers comprise a passageway for transmitting said first liquid and said second liquid; a source providing a electric field in said microfluidic channels; one or more conductor elements placed in an orientation that is perpendicular to the axis of said electric field, at a location within or proximal to said microfluidic channels, whereby interactions between said electric field and each conductor element produce electro-osmotic flows with varied trajectories, and said first liquid and said second liquid are driven across said microfluidic channels so that said first liquid and said second liquid are mixed in said microfluidic channels; and c. delivering the product of (b) to a subject, through an outlet port of said device.

In one embodiment, the method further comprises carrying out iterative introductions of said second liquid to said inlet ports. In another embodiment, the second liquid serves to dilute the drug to a desired concentration.

In another embodiment, this invention provides a method of analyte detection or assay, comprising the steps of:

a. introducing a fluid comprising an analyte to a first inlet port of a microfluidic device, said microfluidic device comprising:

i. one or more inlet ports, at least one outlet port and microfluidic channels in fluid communication with said ports, said channels comprising one or more micropumps, one or more micromixers, or a combination thereof, wherein:

a. said micropumps comprise a passageway for transmitting said suspension and said reagent; a source providing an electric field in said microchannel; at least one conductor element that is placed in an orientation that is perpendicular to the axis of said electric field, at a location within or proximal to said microchannel, whereby interactions between said electric field and said at least one conductor element produce electro-osmotic flows so that said suspension and said reagent are driven across said microfluidic channels; and b. said micromixers comprise a passageway for transmitting said suspension and said reagent; a source providing an electric field in said microfluidic channels; an array of conductor elements placed in an orientation that is perpendicular to the axis of said electric field, at a location within or proximal to said microfluidic channels, whereby interactions between said electric field and each conductor element produce electro-osmotic flows with varied trajectories, and said suspension and said reagent are driven across said microfluidic channels so that said suspension and said reagent are mixed in said microfluidic channels;

c. said microchannels being coated with a reagent for the detection, assay, or combination thereof of said analyte; and detecting, analyzing, or a combination thereof, of said analyte.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
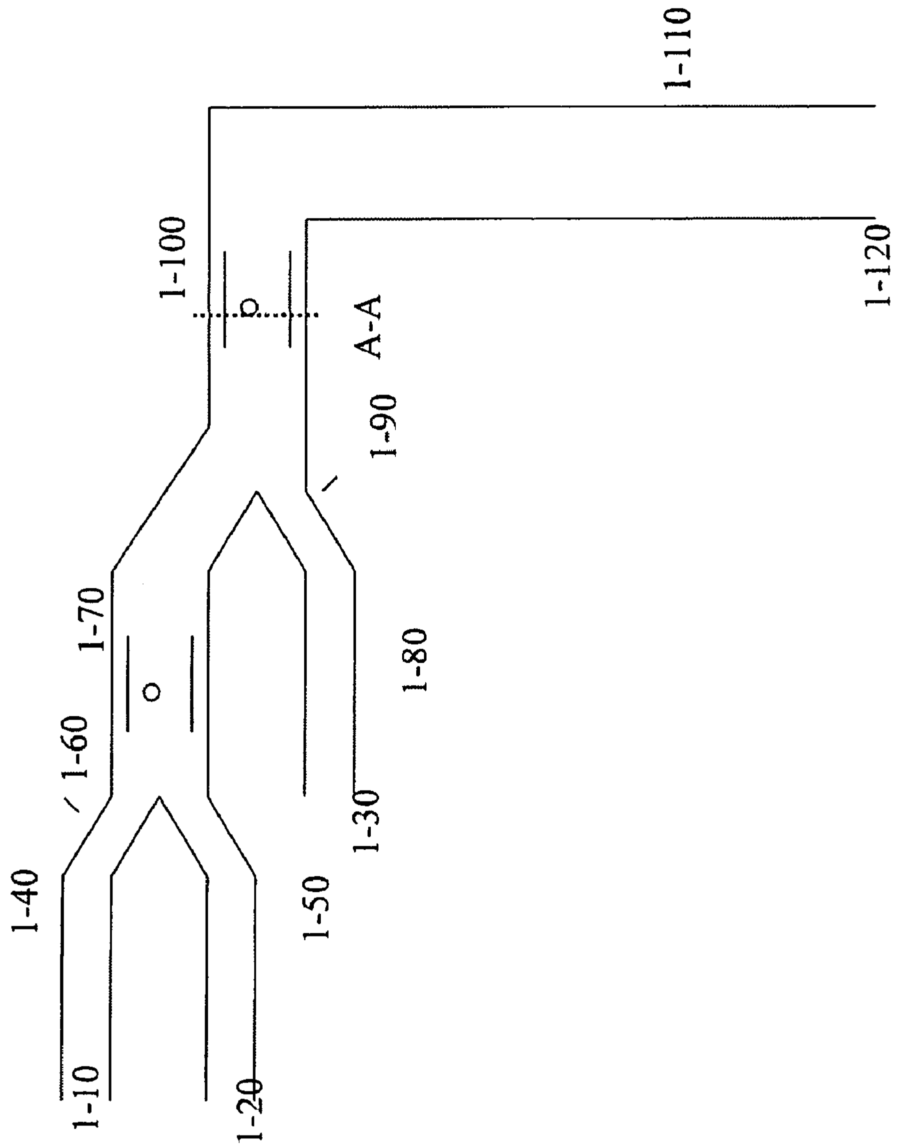
FIG. 1 schematically depicts one embodiment of a microfluidic two-stage mixer, comprising inlet ports 1-10, 1-20, and 1-30 leading to channels 1-40, 1-50, and 1-80 respectively. Channels 140 and 1-50 conjoin to a Y-junction 1-60 and lead to channel 1-70, containing a nonlinear electrokinetic mixer. Channels 1-70 and 1-80 conjoin to a Y-junction 1-90 and lead to channel 1-100 containing a nonlinear electrokinetic mixer. Channel 1-100 connects to channel 1-110 and outlet 1-40.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

This invention provides, in some embodiments, devices and apparatuses comprising the same, for the mixing and pumping of relatively small volumes of fluid. Such devices utilize nonlinear electrokinetics as a primary mechanism for driving fluid flow.

In one embodiment, this invention provides a microfluidic device comprising two or more inlet ports, at least one outlet port and microfluidic channels in fluid communication with said ports, said channels comprising one or more micropumps, one or more micromixers, or a combination thereof, wherein:

- said micropumps comprise a passageway for transmitting an electrolyte fluid; a source providing an electric field in said microchannel; at least one conductor element that is placed in an orientation that is perpendicular to the axis of said electric field, at a location within or proximal to said microchannel, whereby interactions between said electric field and said at least one conductor element produce electro-osmotic flows so that said electrolyte fluid is driven across said microfluidic channels; and
- said micromixers comprise a passageway for transmitting an electrolyte fluid; a source providing an electric field in said microfluidic channels; an array of conductor elements placed in an orientation that is perpendicular to the axis of said electric field, at a location within or proximal to said microfluidic channels, whereby interactions between said electric field and each conductor element produce electro-osmotic; flows with varied trajectories, and said electrolyte fluid is driven across said microfluidic channels so that said electrolyte fluid is mixed in said microfluidic channels.

In one embodiment, the substrate and/or other components of the device can be made from a wide variety of materials including, but not limited to, silicon, silicon dioxide, silicon nitride, glass and fused silica, gallium arsenide, indium phosphide, III-V materials, PDMS, silicone rubber, aluminum, ceramics, polyimide, quartz, plastics, resins and polymers including polymethylmethacrylate (PMMA), acrylics, polyethylene, polyethylene terepthalate, polycarbonate, polystyrene and other styrene copolymers, polypropylene, polytetrafluoroethylene, superalloys, zircaloy?, steel, gold, silver, copper, tungsten, molybdeumn, tantallum, KOVAR, KEVLAR, KAPTON, MYLAR, teflon, brass, sapphire, other plastics, or other flexible plastics (polyimide), ceramics, etc., or a combination thereof. The substrate may be ground or processed flat. High quality glasses such as high melting borosilicate or fused silicas may be used, in some embodiments, for their UV transmission properties when any of the sample manipulation and/or detection steps require light based technologies. In addition, as outlined herein, portions of the internal and/or external surfaces of the device may be coated with a variety of coatings as needed, to facilitate the manipulation or detection technique performed.

In one embodiment, the substrate comprises a metal-bilayer. In some embodiments, the substrate may be further coated with a dielectric and/or a self-assembled monolayer (SAM), to provide specific functionality to the surface of the device to which the material is applied.

In one embodiment, the microchannels comprise the same materials as the substrate, or in another embodiment, are comprised of a suitable material which prevents adhesion to the channels.

In another embodiment, the substrate and/or microchannels of the devices of this invention comprise a material which is functionalized to minimize, reduce or prevent adherence of materials introduced into the device. For example, in one embodiment, the functionalization comprises coating with extracellular matrix protein/s, amino acids, PEG, or PEG functionalized SAM's or is slightly charged to prevent adhesion of cells or cellular material to the surface. In another embodiment, functionalization comprises treatment of a surface to minimize, reduce or prevent background fluorescence. Such functionalization may comprise, for example, inclusion of anti-quenching materials, as are known in the art. In another embodiment, the functionalization may comprise treatment with specific materials to alter flow properties of the material through the device. In another embodiment, such functionalization may be in discrete regions, randomly, or may entirely functionalize an exposed surface of a device of this invention.

In one embodiment, the invention provides for a microchip comprising the devices of this invention. In one embodiment, the microchip may be made of a wide variety of materials and can be configured in a large number of ways, as described and exemplified herein, in some embodiments and other embodiments will be apparent to one of skill in the art. The composition of the substrate will depend on a variety of factors, including the techniques used to create the device, the use of the device, the composition of the sample, the molecules to be assayed, the type of analysis conducted following assay, the size of internal structures, the placement of electronic components, etc. In some embodiments, the devices of the invention will be sterilizable as well, in some embodiments, this is not required. In some embodiments, the devices are disposable or, in another embodiment, re-usable.

Microfluidic chips used in the methods and devices of this invention may be fabricated using a variety of techniques, including, but not limited to, hot embossing, such as described in H. Becker, et al., Sensors and Materials, 11, 297, (1999), hereby incorporated by reference, molding of elastomers, such as described in D. C. Duffy, et. al., Anal. Chem., 70, 4974, (1998), hereby incorporated by reference, injection molding, LIGA, soft lithography, silicon fabrication and related thin film processing techniques, as known in the art, photolithography and reactive ion etching techniques, as exemplified herein. In one embodiment, glass etching and diffusion bonding of fused silica substrates may be used to prepare microfluidic chips.

In one embodiment, microfabrication technology, or microtechnology or MEMS, applies the tools and processes of semiconductor fabrication to the formation of, for example, physical structures. Microfabrication technology allows one, in one embodiment, to precisely design features (e.g., reservoirs, wells, channels) with dimensions in the range of <1 μm to several centimeters on chips made, in other embodiments, of silicon, glass, or plastics. Such technology may be used to construct the microchannels of the devices of this invention, in one embodiment.

In one embodiment, fabrication of die device may be accomplished as follows: first, a glass substrate is metallized. The choice of metal can be made with respect to a variety of desired design specifications, including resistance to oxidation, compatibility with biological materials, compatibility with substrates, etc. The metallization layer may be deposited in a specific pattern (i.e. through adhesive or shadow-masked metal evaporation or sputtering), in one embodiment, or, in another embodiment, it may be etched subsequent to deposition. Metals can include, but are not limited to gold, copper, silver, platinum, rhodium, chromium, etc. In some embodiments, the substrate may be coated with an initial layer of a thin metal, which promotes adhesion of another metal to the substrate. In some embodiments, metals may also be adhered to the substrate via adhesive. In some embodiments, the substrate is ground flat to promote adhesion. In some embodiments, the substrate is roughened to promote metal adhesion.

According to this aspect of the invention, and in one embodiment, the deposited metal may either be deposited in the final topology (i.e. through a mask) or, in another embodiment, patterned post-deposition. According to the latter embodiment, a variety of methods may be used to create the final pattern, as will be understood by one skilled in the art, including inter-alia, etching and laser ablation. Mechanical forms of removal (milling, etc.) may be used, in other embodiments.

In one embodiment, gold is deposited on chromium and the gold is etched using a photoresist mask and a wet gold etchant. The chromium remains a uniform film, providing electrical connection for subsequent electrodeposition (forming the anode connection). In another embodiment, gold is deposited via electron-beam evaporation onto an adhesion layer of titanium. The gold is patterned using a wet etchant and photoresist mask. The titanium is left undisturbed for subsequent electrodeposition.

In another embodiment, the metal may be patterned prior to deposition A shadow mask can be utilized in one embodiment. The desired shape is etched or machined through a thin metal pattern or other substrate. The etched substrate is then held parallel to the base substrate and the material is deposited via evaporation or sputtering through the mask onto the substrate. This method reduces the number of etch steps.

In another embodiment, the patterned surface is formed by transferring a pre-etched or stamped metal film with adhesive onto the substrate. In one embodiment, the various devices on the layer have a common electrical connection enabling subsequent electrodeposition, and are deposited strategically so that release and dicing results in proper electrical isolation.

In another embodiment, a rigid stamp is used to puncture a thin metal film on a relatively pliable elastic (plastic) substrate. The rigid stamp can have, in some embodiments sharp or blunt edges.

In some embodiments, the thickness of deposited metals is tailored to specific applications. In one embodiment, thin metal is deposited onto the surface of the wafer and patterned. According to this aspect of the invention, and in one embodiment, the patterned surface forms a common anodic connection for electroplating into a mold.

In one embodiment, molding may be used. In one embodiment, molding comprises a variety of plastics, ceramics, or other material which is dissimilar to the base substrate. In one embodiment, the molding material is removed following electroplating. In some embodiments, the molding material is sacrificial.

In another embodiment, thick (greater than a few microns) metal is deposited and subsequently etched to form raised metal features.

In other embodiments, welding, assembly via SAMs, selective oxidation of thin metals (conversion of, for instance, aluminum to aluminum oxide) comprise some of the methods used to form insulating areas and provide electrical isolation.

In other embodiments, passivation of the metal surfaces with dielectric materials may be conducted, including, but not limited to, spin-on-glass, low temperature oxide deposition, plastics, photoresists, and other sputtered, evaporated, or vapor-deposited insulators.

In some embodiments, the microfluidic channels used in the devices and/or methods of this invention, which convey fluid, may be constructed of a material which renders it transparent or semitransparent, in order to image the materials being assayed, or in another embodiment, to ascertain the progress of the assay, etc. In some embodiments, the materials further have low conductivity and high chemical resistance to buffer solutions and/or mild organics. In other embodiments, the material is of a machinable or moldable polymeric material, and may comprise insulators, ceramics, metals or insulator-coated metals. In other embodiments, the channel may be constructed from a polymer material that is resistant to alkaline aqueous solutions and mild organics. In another embodiment, the channel comprises at least one surface which is transparent or semi-transparent, such that, in one embodiment, imaging of the device is possible.

In one embodiment, the inlet, or in another embodiment, the outlet may comprise an area of the substrate in fluidic communication with one or more microfluidic channels, in one embodiment, and/or a sample reservoir, in another embodiment. Inlets and outlets may be fabricated in a wide variety of ways, depending upon, in one embodiment, on the substrate material utilized and/or in another embodiment, the dimensions used. In one embodiment inlets and/or outlets are formed using conventional tubing, which prevents sample leakage, when fluid is applied to the device, under pressure. In one embodiment inlets and/or outlets are formed of a material which withstands application of voltage, even high voltage, to the device. In one embodiment the inlet may further comprise a means of applying a constant pressure, to generate pressure-driven flow in the device.

In one embodiment, a "device" or "apparatus" of this invention will comprise at least the elements as described herein. In one embodiment, the devices of this invention comprise at least one microchannel, which may be formed as described herein, or via using other microfabrication means known in the art. In one embodiment, the device may comprise a plurality of channels. In one embodiment, the phrase "a plurality of channels" refers to more than two channels, or, in another embodiment, more than 5, or, in other embodiments, more than 10, 96, 100, 384, 1,000, 1,536, 10,000, 100,000 or 1,000,000 channels.

In one embodiment, the devices of this invention comprise micropumps and/or micromixers as defined herein. In one embodiment, the micropump comprises a passageway for transmitting an electrolyte fluid, which, in one embodiment, is a microchannel as described herein.

In one embodiment, the micropump also comprises a source providing an electric field in the microchannel and at least one conductor element that is placed in an orientation that is perpendicular to the axis of the electric field, at a location within or proximal to the microchannel. Interactions between the electric field and the conductor element produce electro-osmotic flows so that said electrolyte fluid is driven across the microfluidic channels.

In one embodiment, the term "electrolyte fluid" refers to a solution, or in another embodiment, a suspension, or, in another embodiment, any liquid which will be conveyed upon the operation of a device of this invention. In one embodiment, such a fluid may comprise a liquid comprising salts or ionic species. In one embodiment, the ionic species may be present, at any concentration, which facilitates conduction through the devices of this invention. In one embodiment, the liquid is water, or in another embodiment, distilled ionized water which has an ionic concentration ranging from about 10 nM to about 0.1 M. In one embodiment, a salt solution, ranging in concentration from about 10 nM to about 0.1 M is used. In one embodiment, a 1 mM KCl solution, when applied in a device of this invention may provide fluid velocities in excess of 2 mm/s. In one embodiment, higher flows may be obtained when a 100V/cm applied field is used and 50V is applied to the conductor.

In another embodiment, the fluid comprises solutions or buffered media for use suitable for the particular application of the device, for example, with regards to the method of cellular analysis, the buffer will be appropriate for the cells being assayed. In one embodiment, the fluid may comprise a medium in which the sample material is solubilized or suspended. In one embodiment, such a fluid may comprise bodily fluids such as, in some embodiments, blood, urine, serum, lymph, saliva, anal and vaginal secretions, perspiration and semen, or in another embodiment, homogenates of solid tissues, as described, such as, for example, liver, spleen, bone marrow, lung, muscle, nervous system tissue, etc., and may be obtained from virtually any organism, including, for example mammals, rodents, bacteria, etc. In some embodiments, the solutions or buffered media may comprise environmental samples such as, for example, materials obtained from air, agricultural, water or soil sources, which are present in a fluid which can be subjected to the methods of this invention. In another embodiment, such samples may be biological warfare agent samples; research samples and may comprise, for example, glycoproteins, biotoxins, purified proteins, etc.

In one embodiment, the pH, ionic strength, temperature or combination thereof of the media/solution, etc., may be varied, to affect the assay conditions, as described herein, the rate of transit through the device, or combination thereof.

As will be appreciated by those in the art, virtually any experimental manipulation may have been done on the sample prior to its use in embodiments of the present invention. For example, a variety of manipulations may be performed to generate a liquid sample of sufficient quantity from a raw sample. In some embodiments, gas samples and aerosol samples are so processed to generate a liquid sample containing molecules whose separation may be accomplished according to the methods of this invention.

Micropumps of this invention make use of non-linear, electroosmotic flow. In one embodiment, such flow is generated by the elements of the device, and their respective positioning in the device, as exemplified and described herein. In one embodiment, the conductor element is placed in an orientation that is perpendicular to the axis of the electric field, in a device of this invention. In one embodiment, the term "perpendicular" or "perpendicularly" refers to an orientation of a 90° angle with respect to the field axis, +/−5, or in another embodiment, at a 90° angle of +/−10°, or in another embodiment, at a 90° angle +/−20°.

Device operation relies upon the evolution of an electric field around a solid conducting cylinder immersed in a liquid electrolyte, in one embodiment. Just after an electric field is applied, it must intersect a conducting surface at right angles. Mobile ions in the liquid electrolyte are driven along electric field lines—positive ions in the direction of the field, and negative ions opposite the field direction. At the conductor/electrode surface, the field lines terminate, causing ions to accumulate in a small 'diffuse layer' and inducing an opposite 'image charge' in the conductor. Thus, according to this embodiment, positive ions accumulate around the side of the conductor nearest the field source, and negative ions around the side nearest the field sink. This induced-charge 'diffuse layer' grows, gradually expelling field lines, until all field lines are expelled. The steady state field configuration, is the same as that found around a perfect dielectric cylinder, and is attained after a time to=λa/D, which is essentially the "RC" time of an equivalent resistor-capacitor circuit, where D is the diffusivity constant of the electrolyte.

This has important implications for the induced electro-osmotic fluid velocity. The cylinder is surrounded by a dipolar diffuse charge cloud that is positive on one hemisphere and negative on the other. On the top of the cylinder, the positively-charged diffuse cloud is driven along the field lines towards the 'equator' of the cylinder; on the bottom, the negatively-charged diffuse cloud is driven against the field direction—also towards the 'equator' of the cylinder. The resulting 'induced-charge electro-osmotic' slip velocity is quadrupolar in nature. Generically, the induced fluid flow is driven from the 'poles' of the conducting body, towards its 'equator'.

The classical theory of electro-osmosis is based on the assumption that a solid object has a uniform charge density, or zeta potential, which is taken to be a constant material property. While this can be appropriately applied to insulating materials, such as latex, it is certainly not for conductors with free charges, especially out of equilibrium. Although it is not commonly appreciated, the double layers in such conductors will generally develop non-uniform polarizations in space and time in response to applied fields. In simple terms, the interfacial double layer acts as a nonlinear capacitor "skin" between the bulk liquid electrolyte and the conducting solid, and the local electro-osmotic slip, which varies in space and time, is simply given by the product of the tangential field and the potential difference across the capacitor "skin". For an arbitrary shaped conductor, this generally produces an electro-osmotic flow, which draws fluid along the field axis and ejects perpendicular to the field axis, for both AC and DC fields. Weaker flows of the same type can be produced around dielectrics, relying upon polarization by the orientation of bound dipoles rather than the separation of free charges.

Electro-osmotic flows around an uncharged and charged conducting cylinder. The induced-charge electro-osmotic flow around an uncharged conducting cylinder conducting cylinder can arise either from an applied background DC field after the charging time λa/D or from an applied field AC field with a frequency less than ωc=D/λa. Using Eq. 1, one can identify the general sense of the electro-osmotic flow. On the side of the conductor facing the field source, the diffuse charge q is positive, so the fluid slips in the direction of the tangential field $E_1$, forward toward the equator. On the other side, away from the field source, the diffuse charge is negative, so the fluid slips opposite the tangential field direction, toward the equator. Therefore, the electro-osmotic flow for any uncharged conductor generally pulls fluid in along the field axis toward both poles and expels it, radially from the equator.

In weak AC fields, if the field direction is reversed, then so are the signs of the induced charges, and thus the flow remains unchanged. Therefore, this electro-osmotic flow will persist even in an AC applied field. For example, it can be shown that the time averaged slip velocity for a conducting cylinder in a weak background AC field $E_0 \cos(\omega t)$ is given by, $$\langle \mu \rangle = \left(\frac{E_0^2 \varepsilon \alpha}{\eta}\right)\left(\frac{2\sin 2\theta}{1+(\omega/\omega_c)^2}\right) \quad \text{EQ. 2}$$

where $\omega c = D/\lambda a$ (≈103-105 for a ≈1-10 μm and λ≈1-10 nm) is the characteristic double-layer charging frequency, above which the average electro-osmotic slip velocity vanishes because ions cannot relax quickly enough to keep up with the oscillating field.

Note that the typical pumping velocities in weak fields are of the order of microns per second or more, depending on the applied field, which is comparable to other existing electrokinetic phenomena of potential use for microfluidic pumping, and much greater velocities can be achieved with strong fields. Note that the induced-charge electro-osmotic fluid velocity grows with the square of the applied field. This favorable nonlinear response can be exploited in our microfluidic devices to achieve much larger pumping velocities than with "normal electro-osmosis."

If there are no electrochemical reactions at the electrodes, the same diffuse-layer charging effect occurs at the electrode surfaces. It can be shown that following a suddenly imposed DC voltage, the electrode diffuse layers become charged and screen out the bulk electric field at the time scale, $\tau L = \lambda L/D$, where L is the distance between the electrodes. Similarly, for an AC field with applied voltage V0 $\cos(\omega t)$, the bulk electric field amplitude is given by $$E_\mu = \left(\frac{V_o}{L}\right)\left(\frac{1}{1+(2\omega_L/\omega)^2}\right) \quad \text{EQ 3}$$

which decays to zero above the characteristic frequency $\omega_L = D/\lambda L \approx 1$-10 Hz for L≈100-10,000 μm and λ≈1-10 nm.

Therefore, strong induced-charge electro-osmotic flows driven by AC applied voltages can persist only in a certain band of driving frequencies, $\omega_L \leqq \omega \leqq \omega_a$. For example, if a=10 um and lambda=10 nm, $w_a$=300 Hz.

Induced-charge electro-osmotic flows around a charged cylinder, where the cylinder is electrically isolated with a non-zero charge, produces the flow described hereinabove combined with the normal electro-osmotic flow, which simply wraps around the object. Since the latter flow is proportional to the field and the total charge, it changes direction if the electric field is reversed, and therefore, it averages to zero in an AC field, leaving only a quadrupolar induced-charge electro-osmotic flow, regardless of the total charge of the conductor.

Induced-charge distributions and slip velocities for various asymmetric conducting objects in a DC or AC field, are envisioned as well. By manipulating the fore-aft symmetry of a conductor in a DC or AC applied field, a net osmotic flow along the field axis or a net phoretic swimming velocity can be produced. For example, a conducting cylinder whose fore-aft symmetry is broken through the application of a metallic coating with a higher Stern compact layer capacitance, which absorbs ions and prevents them from producing electro-osmotic slip, reduces the pumping effect on the coated side relative to the uncoated side, resulting in a net flow past the object.

In another embodiment, a directed electro-osmotic osmotic flow, even in an AC field, can be obtained. In one embodiment, the arrangement includes a cylinder, which is partially insulated with a dielectric coating used to suppress double-layer charging (for example using with a layered strip). Following a time-dependent diffuse-layer charging, the effect of the dielectric coating is, in one embodiment, to bring the negative ions towards the sides of the cylinder and the positive ions on the bottom region of the cylinder. The slip velocity produced by the negative charges is directed downward past the equatorial region of the cylinder, towards the uncoated side. The positive charges also produce a slip velocity directed upward toward the equatorial region of the cylinder. Note that the magnitude of the slip velocity formed by the negative charges is larger in magnitude than the slip velocity formed by the positive charges, due to the stronger tangential field near the equator compared to that near the pole. The net osmotic flow would thus be directed downward, toward the uncoated side. It is important to note as well that a conducting cylinder, which is entirely coated with a dielectric layer has a greatly reduced induced-charge electro-osmotic fluid flow; and clean conductor/electrolyte surfaces obviate this issue.

In another embodiment, an asymmetric, using a tear-drop asymmetric shaped conductor—or more generally, any asymmetrically-shaped body, can produce a directed induced-charge electro-osmotic flow under the influence of an AC electric field. When a background field is applied, the teal-drop asymmetric shaped conductor, for example, produces positive and negative charge regions. According to this aspect of the invention, and in one embodiment, the negative charge regions include the most curved region, of the tear-drop shaped conductor. The positive regions include the less curved portion of the tear-drop shaped conductor. The direction of the slip velocity formed by the negative charge regions is directed downward, and the direction of the slip velocity formed by the positive charge regions is upward along the tear-drop shaped conductor. The magnitude of the slip velocity produced by the negative charge regions is larger than the magnitude of the slip velocity produced by the positive charge regions. Therefore, the net electro-osmotic flow is directed towards the region of lower curvature, downward along the tear-drop shaped conductor.

In another embodiment, the direction of the background field changes, such that the charge distribution also changes. For example, the negative regions will include the bottom regions of the tear-drop shaped conductor, and the positive charge regions will include the upper most curve regions of the tear-drop shape conductor. In one embodiment, however, the field driving the induced-charge electro-osmotic flow is also reversed, so that the net electro-osmotic flow remains a net downward, away from the pointed edge. Thus, net flow persists in an AC field, which is very different from normal electro-osmosis, which averages to zero in an AC field.

In some embodiments, the conductor configurations described have a symmetry, which is broken in the fore-aft sense, measured relative to the applied field direction. The left-right symmetry of the conductor may also be broken, in another embodiment, leading to induced-charge electro-osmotic flows which are driven perpendicular to the applied field, and which persist even in AC fields.

In one embodiment, electro-osmotic micropumps may be positioned in a device to form, or conduct into cross, T, Y and/or elbow junctions. Using the principles hereinbefore regarding electro-osmotic flow, one can design different junction pump arrangements. By using a working conductor in conjunction with an applied electric field, the induced-charge electro-osmotic flow generally drives fluid flow in along the field axis and ejects it out from the 'equator', perpendicular to the field axis. This effect can be used to pump fluid at right angles, by simply placing a cylindrical conducting wire in the junction, perpendicular to the field axis and the plane of flow.

Figure 3A:
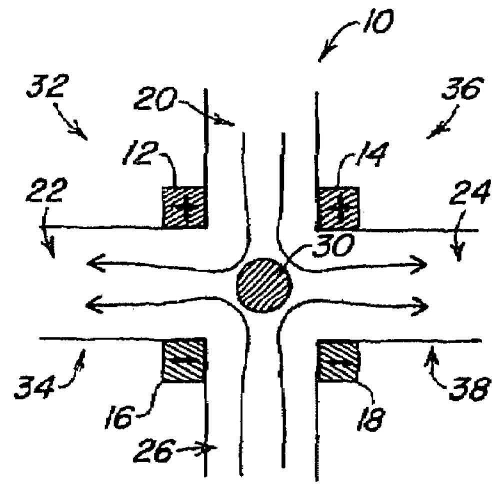
FIG. 3 schematically depicts induced-charge electro-osmotic micropump designs for sample cross, elbow, and T junctions.

For example, in FIG. 3A, a microfluidic cross-shaped micropump design 3-10 is shown. The cross-shaped micropump design 3-10 includes four junction walls 3-32, 3-34, 3-36, and 3-38, four electrodes 3-12, 3-14, 3-16, and 3-18, and a cylindrical conductor 3-30. The cylindrical conductor 30 has transient surface charges in the applied field, which drive the electro-osmotic flow. In the configuration of FIG. 3A, electrodes 3-12 and 3-14 have the same polarity whereas electrodes 3-16 and 3-18 have the opposite polarity, which sets up a field in the vertical direction, causing a pumping of fluid from the vertical channels into the horizontal channels. By switching electrode polarity so that electrodes 3-12 and 3-16 have the same polarity and electrodes 3-14 and 3-18 have the opposite polarity, the field can be switched from vertical to horizontal, and the pumping direction can be reversed. Also, the cylindrical conductor is strategically placed at the intersection point between the microchannels 3-70, 3-22, 3-24, and 3-26.

Figure 3B:
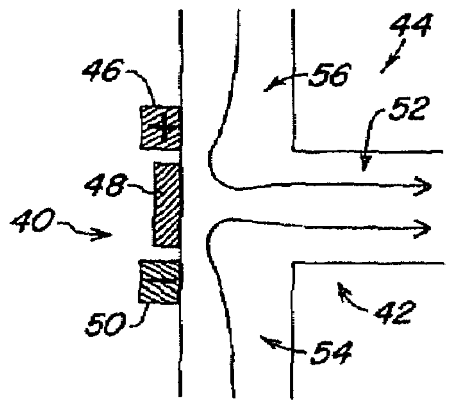

FIG. 3B demonstrates a T-junction micropump arrangement 3-58. The T-junction micropump arrangement 3-58 includes junction walls 3-40, 3-42, and 3-44, a pair of electrodes 3-46 and 3-50, and a conducting plate 3-48 placed on the junction wall 3-40 between the pair of electrodes 346 and 3-50. The flow is directed into the microchannel 3-52. In this embodiment, the polarities of the pair of electrodes 3-46 and 3-50 cannot be reversed, thus preventing the reversal of the pump. However, a reversible T-junction can also be designed with four electrodes and a conduction post, like in FIG. 3A with one channel closed. This allows the flow direction to be driven either into or out of microchannel 3-52.

Figure 3C:
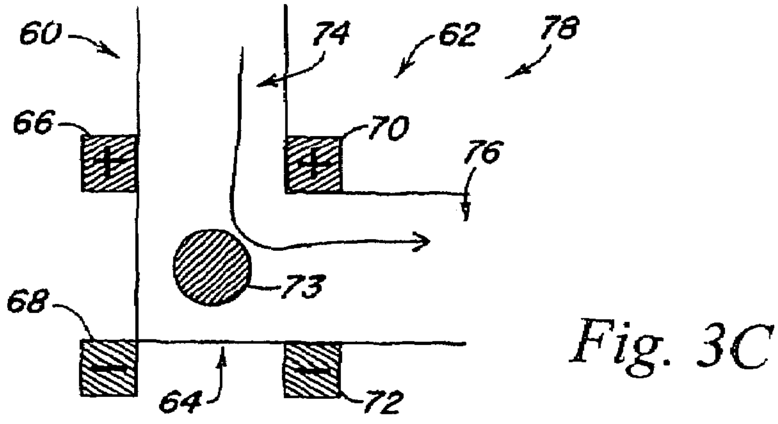

FIG. 3C demonstrates an elbow junction arrangement 3-78. This arrangement includes four electrodes 3-66, 3-68, 3-70, and 3-72, a cylindrical conductor 3-73, and junction walls 3-60, 3-62, and 3-64. The electrodes 3-66, 3-68, 3-70, and 3-72 are aligned on the junction walls 3-60, 3-62, and 3-64. The cylindrical conductor 3-73 is strategically placed in the center of intersection point between microchannels 3-74 and 3-76. By placing the cylindrical conductor 3-73 in the junction, perpendicular to the field axis and the plane of flow, the fluid is driven around a corner to microchannel 3-76. In this embodiment, the electrodes 3-66 and 3-70 have the same polarity and the electrodes 3-68 and 3-72 have the opposite polarity, and the direction of the pumping is from microchannel 3-74 toward microchannel 3-76. However, by driving electrodes 3-66 and 68 with the same polarity, and 70 and 72 with polarity opposite to that of electrodes 3-66 and 3-68, the direction of flow is reversed, pumping fluid into microchannel 3-74

The junction pumps shown in FIGS. 3A-3C and described above can be operated using a DC electric field or an AC electric field, or a pulsed AC electric field. Furthermore, the 'working' conductor in each of these devices can be electrically isolated from the electrodes, which drive the electric field; or the working conducting element can be held at a fixed potential or grounded. Holding the working conductor at a fixed potential induces an additional induced-charge electro-osmotic flow that is proportional to the square of the applied field, and is directed away from the nearest wall. This additional flow can be incorporated into any of the devices described herein, enhancing the fluid flow driven into certain channels in the micropumps, or providing an additional mixing flow in the mixers described below.

Figure 4A:
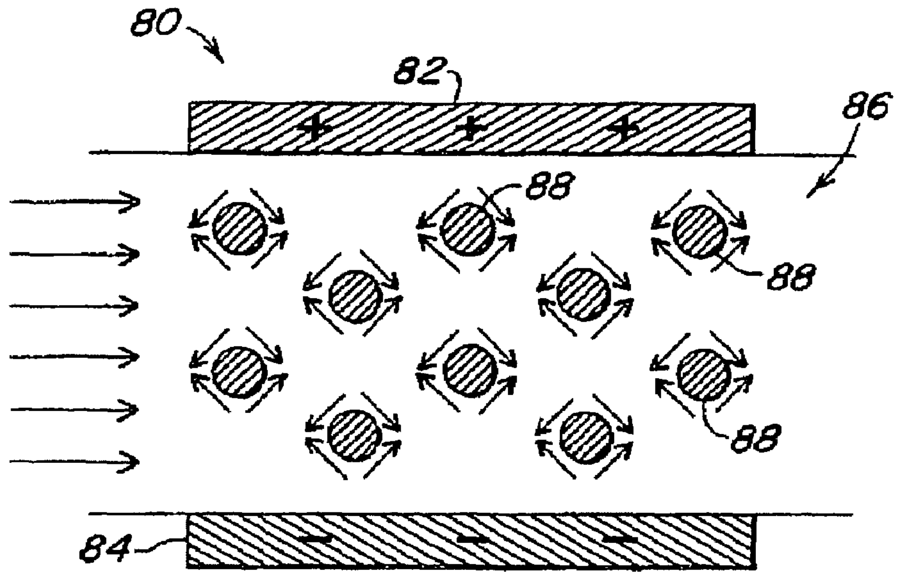
FIG. 4 schematically depicts induced-charge electro-osmotic mixers.

In one embodiment, the devices and/or methods of this invention make use of a micromixer. In one embodiment, the micromixers of this invention comprise a passageway for transmitting an electrolyte fluid; a source providing an electric field in the microfluidic channels; an array of conductor elements placed in an orientation that is perpendicular to the axis of the electric field, at a location within or proximal to the microfluidic channels, whereby interactions between the electric field and each conductor element produce electro-osmotic flows with varied trajectories, and the electrolyte fluid is driven across the microfluidic channels. This results in the electrolyte fluid being mixed in the microfluidic channels In one embodiment, micromixer function is as depicted in FIG. 4. In one embodiment. FIG. 4A, demonstrates a design for a fast induced-charge electro-osmotic mixer 4-80. The mixer 4-80 includes a pair of microelectrodes 4-82 and 4-84 and an array of conducting posts 4-88. The electrode 4-82 is positive and the electrode 84 is negative, and their polarities can be reversed. The conducting posts 4-88 include metallic wires, as in the junction pumps described herein. A background flow passes through the array of conducting posts 4-88. Also, an AC field in the appropriate frequency range ($\omega_L \leqq \omega \leqq \omega_a$) is applied perpendicular to the posts 4-88 and to the mean flow direction, which generates an array of persistent convection rolls via the same electro-osmotic mechanism used in the junction pumps, described herein. The particles in the background flow are advected through convection rolls along complicated trajectories, which stretch fluid elements. This enhances diffusive mixing. Using pulsed AC fields to produce chaotic flows can also further enhance the degree of mixing.

Figure 4B:
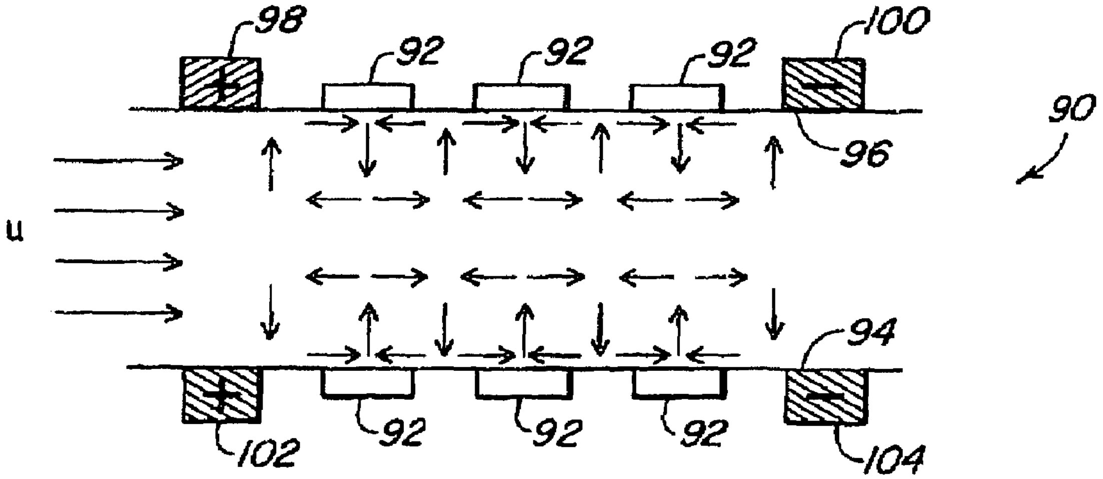

FIG. 4B demonstrates another embodiment for the design for a fast electro-osmotic mixer 4-90. The mixer 490 includes four electrodes 4-98, 4-100, 4-102, and 4-104 and metal strips 4-92 embedded in the interior of the channel walls 4-94 and 4-96. This design produces the same kind of convective mixing produced by the mixer 4-80. By applying an AC or DC field along the channel with the metal strips 4-92 embedded within channel walls 4-94 and 4-96 in between electrodes 4-98, 4-100, 4-102, and 4-104. Various arrows illustrate the convection mixing. As with posts 4-88 described herein, are electrically isolated from the electrodes 4-98, 4100, 4-102, and 4-104. If the metal strips 4-92 were grounded or held at a fixed potential, an additional induced-charge electro-osmotic flow would result, in addition to the flow described here.

Figure 5A:
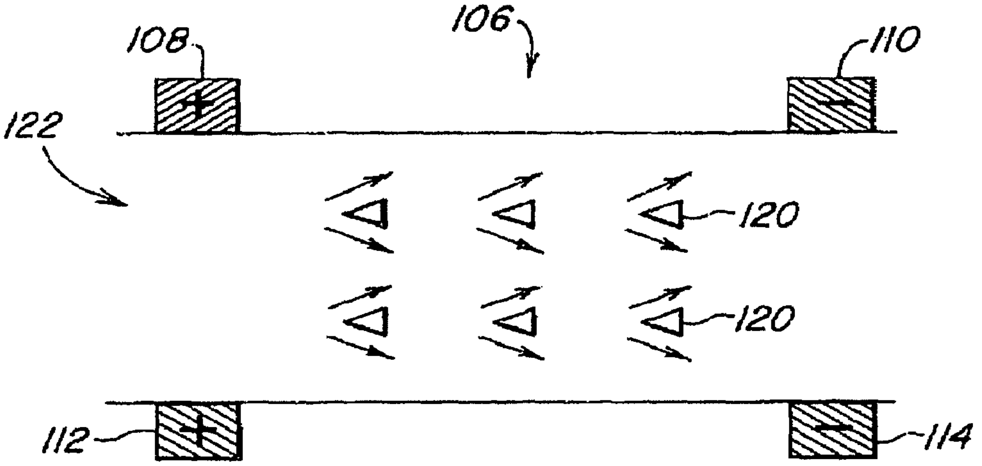
FIG. 5 schematically depicts sample pumps driven by induced-charge electro-osmotic flows generated at asymmetric conducting posts.
Figure 5B:
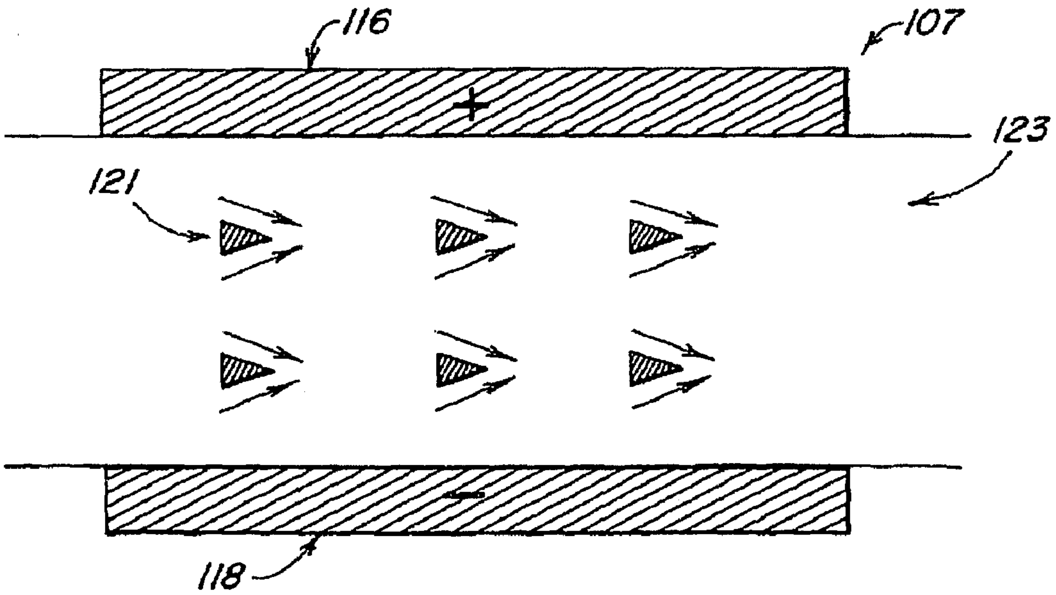

FIGS. 5A and 5B depict other embodiments of pumps driven by electro-osmotic flows generated at asymmetric conducting posts. As described herein, a conductor in AC or DC applied fields with broken fore-aft or left-right symmetry generally produce net electro-osmotic pumping along die direction of broken symmetry. Therefore, it is possible to produce linear channel pumps using conducting posts, which possess broken asymmetry. Triangular conducting posts 5-120 are shown in FIGS. 5A-5B and represent embodiments for methods of breaking the symmetry of the conducting array, of which three examples are shown in FIGS. 3A-3C. Furthermore, the applied field can either be along the direction of the channel as shown in FIG. 5A or across the channel, perpendicular to it as shown in FIG. 5B. In all cases, fluid flow is driven along the channel.

FIG. 5A demonstrates a linear-channel pump 5-106. The linear-channel pump 5-106 includes electrodes 5-108, 5-110, 5-112, and 5-114, asymmetric conducting posts 5-120, and a microchannel 5-122. FIG. 5B demonstrates a linear-channel pump 5-107. The linear-channel pump 5-107 includes electrodes 5-116 and 5-118, asymmetric conducting posts 5-121, and a microchannel 5-123. The posts 5-120 and 5-121 are schematically represented by triangles to indicate any of the general symmetry-breaking mechanisms, of which three are shown in FIGS. 3A-3C. The linear channel pumps 5-106 and 5-107 are driven by electro-osmotic flows generated by posts with symmetry broken in the channel direction, and an AC or DC field directed along or across the microchannels 5-122 and 5-123. Other broken symmetry conducting posts, such as conducting posts having a cross-section of a tear-drop or triangle, dielectric or metallic partial coatings, can also be used. In the case of a broken fore-aft spatial symmetry, as shown in FIG. 5A, the sharpest point of the cross section is directed opposite to the desired flow direction of induced-charge electro-osmotic pumping. In the case of a broken left-right spatial symmetry, as shown in FIG. 5B, the sharpest point of the cross section is directed in the desired direction of induced-charge electro-osmotic pumping. Another embodiment for preparing such posts (5-120 and 5-121) may be to simply place two or more wires of different cross sections against each other to approximate the triangle's shape. In this way, an AC electro-osmotic linear-channel pump can be built out of ordinary metal micro-wires of circular cross-section.

Unlike the junction pumps described herein, which are driven by a single electro-osmotic source that cannot drive flows across very large distances, the asymmetric posts can be arranged in extended arrays to provide the distributed forcing needed to drive fluid quickly along lengthy channels.

Figure 6A:
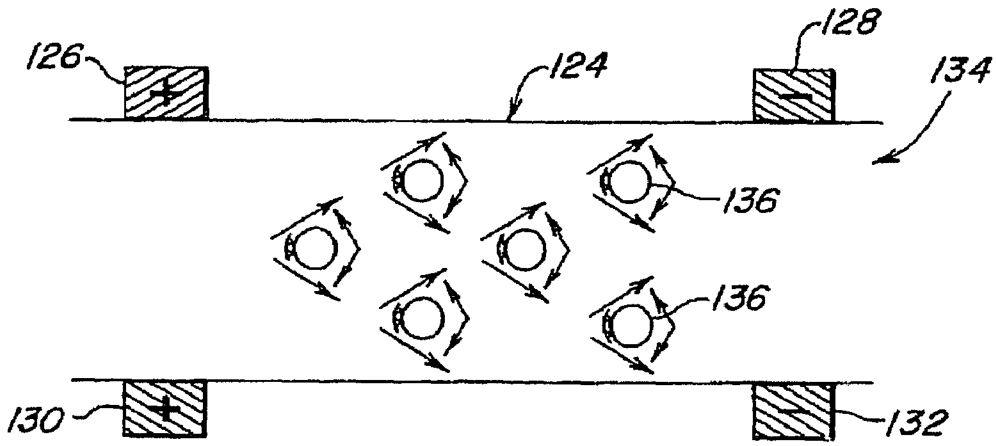
FIG. 6 schematically depicts linear-channel pump-mixers driven by electro-osmotic flows.

FIGS. 6 A and B are schematics of embodiments of linear-channel pump-mixers driven by electro-osmotic flows. The design of the linear-channel pump can be altered to produce microfluidic devices, which can simultaneously pump and mix fluids. FIG. 6A demonstrates a pump-mixer arrangement 6-124 that includes electrodes 6-126, 6-128, 6-130, and 6-131, asymmetric conducting posts 6-136 associated with a cylinder covered with a dielectric or metallic coating, and a microchannel 6-134. The electrodes 6-126, 6-128, 6-130, and 6-132 permit reversing their polarities and producing AC or DC fields. Instead of four electrodes, two electrodes, as in FIG. 5B, placed on either side of the channel and driving an AC or DC electric field perpendicular to the channel direction can also be used. The coatings of the conducting posts 6-136 are directed opposite the flow direction, in an AC or DC field directed along the microchannel 6-134. Given that each of the conducting posts 6-136 produces flows that are directed in along the field axis and out perpendicular to the field axis, this provides an overall mixing pattern shown in FIG. 6A. Also, the asymmetric shape provides the necessary force to pump fluid though the microchannel 6-134. Of course, any broken symmetry will be sufficient to produce a pump/mixer, as discussed above.

Figure 6B:
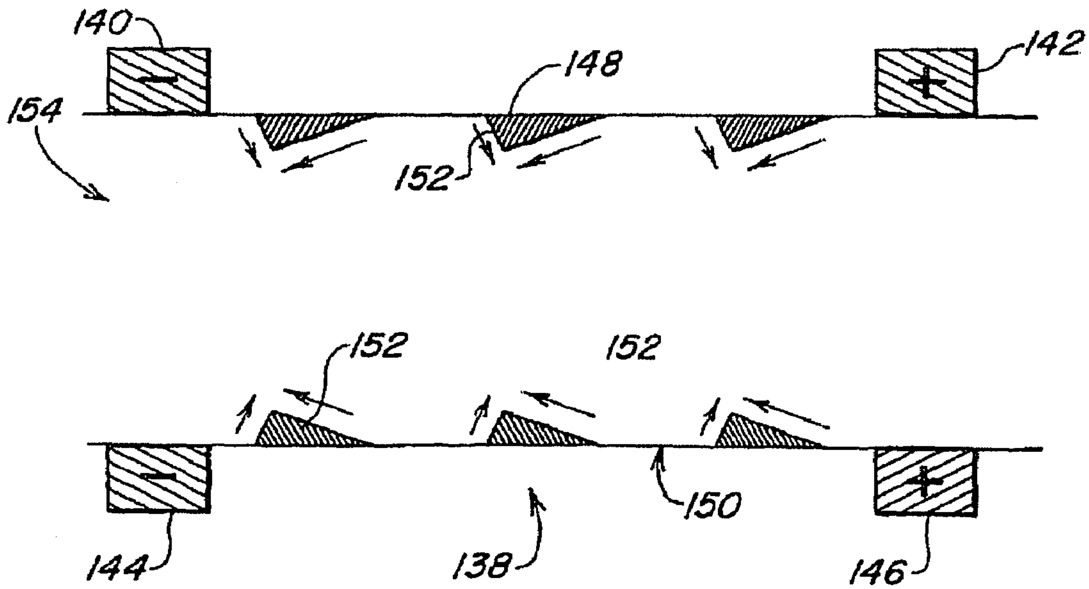

FIG. 6B demonstrates another arrangement of a linear-channel pump-mixer 6-138. The pump-mixer 6-138 includes four electrodes 6-140, 6-142, 6-144, and 6-146 and asymmetric metal ridges 6-152 patterned on the walls 6-149 and 6-150 of a microchannel 154 between the electrodes 6-140, 6-142, 6-144, and 6-146. The electrodes 6-140, 6-142, 6-144, and 6-146 allow reversing their polarities and producing AC or DC fields. The asymmetric ridges 6-152 are designed to lean in the direction of the flow, in an AC or DC field directed along the microchannel 6-154. The surface of the asymmetric ridges 6-152 is a grooved metallic surface, not connected in any way to the external circuit, which includes normal electrodes positioned in the channel walls 6-148 and 6-150 on either side of the grooved surface.

In one embodiment, the conductor element is an array of conducting elements, as will be appreciated by one skilled in the art. Some embodiments of arrays of such elements are described hereinabove. In some embodiments, the arrays may comprise a lattice, which may have a variety of geometries, such as a square, hexagon, etc., as will be appreciated by one skilled in the art. Such orientation or arrays may be particularly useful in the micromixers of this invention. In one embodiment, a single unit functions as both micropump and micromixer, as will be appreciated by one skilled in the art. In one embodiment, the term "mixing" as used herein refers to circulation of materials to promote their distribution in a volume of space, for example, a mixture of 2 species, in a device of this invention, refers, in one embodiment, to a random distribution of the 2 species within a given volume of space of the device, e.g., in a microchannel of the devices of this invention. In one embodiment, the term "circulation" and "mixing" are interchangeable. In one embodiment, mixing refers to a change in a particular distribution which is not accompanied by agitation of the sample, in one embodiment, or in another embodiment, minimal agitation and/or formation of "bubbles" in the liquid medium in which the species are conveyed.

In some embodiments, the conducting element may be fashioned to assume a variety of geometries, as described and exemplified herein. In one embodiment, such design will reflect a consideration of a desired trajectory for a particular application. In some embodiments, the geometry may approximate an arrowhead, a teardrop, or elliptical shape, or one related thereto.

While the electrode and field polarities as "+" and "−" signs throughout, all fields can also be AC or DC corresponding to electrode polarities oscillating between + and −, giving rise to the same induced-charge electro-osmotic flow. Thus all of the devices of the invention can operate in AC or DC.

In some embodiments, the present invention provides for the operation of the device in AC with DC offset, as will be understood by one skilled in the art, for example, as described in U.S. Pat. No. 5,907,155. In another embodiment, asymmetric driving signals may be used.

The invention provides a number of designs for microfluidic devices taking advantage of induced-charge electro-osmotic flows around conductors. Although these devices can operate with DC voltages, the invention also works with AC applied voltages.

In one embodiment, the device is adapted such that analysis of a species of interest may be conducted, in one embodiment, in the device, or in another embodiment, downstream of the device. In one embodiment, analysis downstream of the device refers to removal of the obtained product from the device, and placement in an appropriate setting for analysis, or in another embodiment, construction of a conduit from the device, for example, from a collection port, which relays the material to an appropriate setting for analysis. In one embodiment, such analysis may comprise signal acquisition, and in another embodiment, a data processor. In one embodiment, the signal can be a photon, electrical current/impedance measurement or change in measurements. It is to be understood that the devices of this invention may be useful in various analytical systems, including bioanalysis microsystems, due to the simplicity, performance, robustness, and integrabilty to other separation and detection systems, and any integration of the device into such a system is to be considered as part of this invention. In one embodiment, this invention provides an apparatus comprising a device of this invention, which in some embodiments, comprises the analytical modules as described herein.

Device geometry can take a variety of shapes and sizes. In nearly all devices, there are at least two electrodes. These electrodes can be raised off the base substrate or flat. Electrodes can be integrated into microchannels, microchannel walls, or can be external to the channel and the channel walls.

In some embodiments, there can be a center electrode. This center electrode can be cylindrical, pear-shaped, elliptical, arrow-shaped, etc. There may be multiple center electrodes. In devices with multiple center electrodes, all electrodes can be the same shape, different shapes, different sizes, etc. Center electrodes can be electrically insulated form one another, electrically connected, or electrically connected in groups. External circuitry can be used to control electrical connections. External circuitry can be used to fix the voltage/potential of any or all of the center electrodes. Center electrode potential can be controlled relative to the two outer electrodes in magnitude, frequency, and phase lag.

In some embodiments, the total charge on the center electrodes can also be controlled. Charge can be controlled relative to the outer electrodes in magnitude, frequency, and phase lag, as above.

In some embodiments, a raised center electrode and flat outer electrodes can be employed to maximize out-of-plane mixing (and the out-of-plane electric field components). Various shapes of outer electrodes can also be employed to effectively tailor mixing and/or pumping.

In some embodiments, additional electrode geometries can include rounded portions, which can be fabricated for instance, by evaporating through a narrow slit, or by wet etching a vertical, electroplated electrode.

In some embodiments, the outer electrodes can be arranged in a variety of geometries relative to the center electrode. The outer electrodes can be parallel to one another and transverse to a background fluid flow, or in other embodiments, they can be parallel to one another and parallel to background fluid flow. In some embodiments, they can have an angle between them, resulting in some electric field gradients, which may enhance fluid mixing on the front or backside of the center electrode. In some embodiments, they can be substantially circular, nearly surrounding the center electrode. In some embodiments, the spacing of the outer electrodes can be controlled to tailor the driving and control voltage/charge requirements, i.e. within a particular range of voltages or at a particular frequency.

The electrical connections between electrodes and external circuitry (the distinction is made between internal comprising the fluid channel and electrodes, and the external comprising all electrical connections, etc.), can, in some embodiments, be as simple as planar wires connecting the center posts to the external circuits. The electrical connections can be electroplated, in some embodiments. The electrical connections can be buried beneath an insulating material, in some embodiments.

Driving and control electronics can be manufactured on-chip along with the electrodes, in some embodiments. The driving and control electronics can be a separate electronics module, in some embodiments, an external stand-alone unit or microfabricated electronics. The microfabricated electronics module, in some embodiments, can be wire-bonded to the chip containing the electrodes or can be flip-chip bonded.

In another embodiment, a center electrode is formed by attaching a pre-fabricated metal rod to a metal post deposited or patterned on the surface of the substrate. The attachment can be via chemical bonds, welded, or any other means.

Fluidic channels can be fabricated by a variety of means, including soft-lithographic molding of polymers on rigid or semi-rigid molds. Channels can also be fabricated in glass via wet etching, plasma etching or similar means. Channels can be formed in plastics via stamping, hot embossing, or other similar machining processes. The channels can then be bonded to the substrate containing the electrode structures. Alignment marks can be incorporated onto the substrate to facilitate assembly. In some instances, metal surfaces can be exposed on substrate and channels to enable metal-to-metal bonding. Glass-to-glass bonding can be done at elevated temperatures and with applied potential. Plastic-to-glass can be facilitated with cleaning of glass surfaces prior to bonding, or fabrication of the fluidic portion of the device can be accomplished by any means known in the art.

Raised obstacles of an insulating or semiconducting nature can be fabricated on the substrate as well, in some embodiments, to provide obstacles to impede or change fluid flow. The fluidic channel geometries can also be tailored to affect dispersion or mixing.

In some embodiments, the conductor element will have a defined radius. In some embodiments, the conductor element will have a radius of about 5-500 nm. In one embodiment, the conductor element will have a radius of about 5 μm, or in another embodiment, about 10 μm, or in another embodiment, about 15 μm, or in another embodiment, about 20 μm, or in another embodiment, about 25 μm, or in another embodiment, about 50 μm, or in another embodiment, about 75 μm, or in another embodiment, about 100 μm, or in another embodiment, about 125 μm, or in another embodiment, about 150 μm, or in another embodiment, about 175 μm, or in another embodiment, about 200 μm, or in another embodiment, about 225 μm, or in another embodiment, about 250 μm, or in another embodiment, about 275 μm, or in another embodiment, about 300 μm, or in another embodiment, about 350 μm, or in another embodiment, about 400 μm, or in another embodiment, about 450 μm, or in another embodiment, about 500 μm.

In some embodiments, this invention provides for analysis, detection, concentration, processing, assay, production of any material in a microfluidic device, whose principle of operation comprises electro-osmotically driven fluid flow, for example, the incorporation of a source providing an electric field in a microchannel of the device, and provision of an electrokinetic means for generating fluid motion whereby interactions between the electric field and induced-charge produce electro-osmotic flows. Such flows may in turn, find application in fluid conductance, mixing of materials, or a combination thereof, and any application which makes use of these principles is to be considered as part of this invention, representing an embodiment thereof.

In some embodiments, this invention provides a microfluidic device comprising one or more inlet ports, at least one outlet port, and microfluidic channels in fluid communication with said ports, where the channels comprise one or more micropumps or one or more micormixers, or a combination thereof. According to this aspect of the invention, the micropumps comprise a passageway for transmitting an electrolyte fluid, a source providing an electric field in the microchannel and an electrokinetic means for generating fluid motion, whereby interactions between the electric field and induced-charge produce electro-osmotic flows. In another embodiment, according to this aspect of the invention, AC driven electro-osmosis may be accomplished without use of a conductor element positioned perpendicularly to the electric field, yet another electrokinetic means for generating fluid motion is provided in the device, as will be understood by one skilled in the art, and such a permutation is to be considered as part of this invention, as well.

In another embodiment, this invention provides a method of cellular analysis, comprising the steps of:

a. introducing a buffered suspension comprising cells to a first inlet port of a microfluidic device;

b. introducing a reagent for cellular analysis to said first inlet port or a second inlet port of said microfluidic device, said microfluidic device comprising:

i. one or more inlet ports, at least one outlet port and microfluidic channels in fluid communication with said ports, said channels comprising one or more micropumps, one or more micromixers, or a combination thereof, wherein:

said micropumps comprise a passageway for transmitting said suspension and said reagent; a source providing an electric field in said microchannel; at least one conductor element in an orientation that is perpendicular to the axis of said electric field, at a location within or proximal to said microchannel, whereby interactions between said electric field and said at least one conductor element produce electro-osmotic flows so that said suspension and said reagent are driven across said microfluidic channels; and said micromixers comprise a passageway for transmitting said suspension and said reagent; a source providing an electric field in said microfluidic channels; at least one conductor element in an orientation that is perpendicular to the axis of said electric field, at a location within or proximal to said microchannel, whereby interactions between said electric field and said conductor element produce electro-osmotic flows with varied trajectories, and said suspension and said reagent are driven across said microfluidic channels so that said suspension and said reagent are mixed in said microfluidic channels; and d. analyzing at least one parameter affected by contact between said suspension and said reagent.

In one embodiment, the reagent is an antibody, a nucleic acid, an enzyme, a substrate, a ligand, or a combination thereof. In another embodiment, the reagent is coupled to a detectable marker, which in another embodiment is a fluorescent compound. In another embodiment, the device is coupled to a fluorimeter or fluorescent microscope. In another embodiment, the device is comprised of a transparent material.

In another embodiment, the method further comprises the step of introducing a cellular lysis agent in an inlet port of said device. According to this aspect of the invention, and in one embodiment, the reagent specifically interacts or detects an intracellular compound.

In one embodiment, this invention provides a method of cellular analysis using a device or apparatus of this invention. In one embodiment, the method of cellular analysis comprises the steps of:

a. introducing a buffered suspension comprising cells to a first inlet port of a microfluidic device;

b. introducing a reagent for cellular analysis to a second inlet port of said microfluidic device, said microfluidic device comprising:

i. two or more inlet ports, at least one outlet port and microfluidic channels in fluid communication with said ports, said channels comprising one or more micropumps, one or more micromixers, or a combination thereof, wherein:

said micropumps comprise a passageway for transmitting said suspension and said reagent; a source-providing an electric field in said microchannel; at least one conductor element that is placed in an orientation that is perpendicular to the axis of said electric field, at a location within or proximal to said microchannel, whereby interactions between said electric field and said at least one conductor element produce electro-osmotic flows so that said suspension and said reagent are driven across said microfluidic channels; and said micromixers comprise a passageway for transmitting said suspension and said reagent; a source providing an electric field in said microfluidic channels; an array of conductor elements placed in an orientation that is perpendicular to the axis of said electric field, at a location within or proximal to said microfluidic channels, whereby interactions between said electric field and each conductor element produce electro-osmotic flows with varied trajectories, and said suspension and said reagent are driven across said microfluidic channels so that said suspension and said reagent are mixed in said microfluidic channels; and c. analyzing at least one parameter affected by contact between said suspension and said reagent.

One embodiment of carrying out such cellular analysis is exemplified herein, in Example 2.

In one embodiment, the surface of the microchannel may be functionalized to reduce or enhance adsorption of species of interest to the surface of the device. In another embodiment, the surface of the microchannel has been functionalized to enhance or reduce the operation efficiency of the device.

In one embodiment, the device is further modified to contain an active agent in the microchannel, or in another embodiment, the active agent is introduced via an inlet into the device, or in another embodiment, a combination of the two is enacted. For example, and in one embodiment, the microchannel is coated with an enzyme at a region wherein molecules introduced in the inlet will be conveyed past, according to the methods of this invention. According to this aspect, the enzyme, such as, a protease, may come into contact with cellular contents, or a mixture of concentrated proteins, and digest them, which in another embodiment, allows for further assay of the digested species, for example, via introduction of a specific protease into an inlet which conveys the enzyme further downstream in the device, such that essentially digested material is then subjected to the activity of the specific protease. This is but one example, but it is apparent to one skilled in the art that any number of other reagents may be introduced, such as an antibody, nucleic acid probe, additional enzyme, substrate, etc.

In one embodiment, processed sample is conveyed to a separate analytical module. For example, in the protease digested material described hereinabove, the digestion products may, in another embodiment, be conveyed to a peptide analysis module, downstream of the device. The amino acid sequences of the digestion products may be determined and assembled to generate a sequence of the polypeptide. Prior to delivery to a peptide analysis module, the peptide may be conveyed to an interfacing module, which in turn, may perform one or more additional steps of separating, concentrating, and or focusing.

In another embodiment, the microchannel may be coated with a label, which in one embodiment is tagged, in order to identify a particular protein or peptide, or other molecule containing the recognized epitope, which may be a means of sensitive detection of a molecule in a large mixture, present at low concentration.

For example, in some embodiments, reagents may be incorporated in the buffers used in toe methods and devices of this invention, to enable chemiluminescence detection. In some embodiments the method of detecting the labeled material includes, but is not limited to, optical absorbance, refractive index, fluorescence, phosphorescence, chemiluminescence, electrochemiluminescence, electrochemical detection, voltametry or conductivity. In some embodiments, detection occurs using laser-induced fluorescence, as is known in the art.

In some embodiments, the labels may include, but are not limited to, fluorescent lanthanide complexes, including those of Europium and Terbium, fluorescein, fluorescamine, rhodamine, tetramethylrhodamine, eosin, erythrosin, coumarin, methyl-coumarins, pyrene, Malacite green, stilbene, Lucifer Yellow, Cascade Blue™, Texas Red, 1,1'-[1,3-propanediylbis[(dimethylimino-3,1-propanediyl]]bis[4-[(3-methyl-2(3H)-benzoxazolylidene)methyl]], tetraioide, which is sold under the name YOYO-1, Cy and Alexa dyes, and others described in the 9th Edition of the Molecular Probes Handbook by Richard P. Haugland, hereby expressly incorporated by reference. Labels may be added to 'label' the desired molecule, prior to introduction into the devices of this invention, in some embodiments, and in some embodiments the label is supplied in a microfluidic chamber. In some embodiments, the labels are attached covalently as is known in the art, or in other embodiments, via non-covalent attachment.

In some embodiments, photodiodes, confocal microscopes, CCD cameras, or photomultiplier tubes maybe used to image the labels thus incorporated, and may, in some embodiments, comprise the apparatus of the invention, representing, in some embodiments, a "lab on a chip" mechanism.

In one embodiment, detection is accomplished using laser-induced fluorescence, as known in the art. In some embodiments, the apparatus may further comprise a light source, detector, and other optical components to direct light onto the microfluidic chamber/chip and thereby collect fluorescent radiation thus emitted. The light source may comprise a laser light source, such as, in some embodiments, a laser diode, or in other embodiments, a violet or a red laser diode. In other embodiments, VCSELs, VECSELs, or diode-pumped solid state lasers may be similarly used. In some embodiments, a Brewster's angle laser induced fluorescence detector may used. In some embodiments, one or more beam steering mirrors may be used to direct the beam to a desired location for detection.

??In one embodiment, a solution or buffered medium comprising the molecules for assay are used in the methods and for the devices of this invention. In one embodiment, such solutions or buffered media may comprise natural or synthetic compounds. In another embodiment, the solutions or buffered media may comprise supernatants or culture media, which in one embodiment, are harvested from cells, such as bacterial cultures, or in another embodiment, cultures of engineered cells, wherein in one embodiment, the cells express mutated proteins, or overexpress proteins, or other molecules of interest which may be thus applied. In another embodiment, the solutions or buffered media may comprise lysates or homogenates of cells or tissue, which in one embodiment, may be otherwise manipulated for example, wherein the lysates are subject to filtration, lipase or collagenase, etc., digestion, as will be understood by one skilled in the art. In one embodiment, such processing may be accomplished via introduction of the appropriate reagent into the device, via, coating of a specific channel, in one embodiment, or introduction via an inlet, in another embodiment.

It is to be understood that any complex mixture, comprising two or more molecules, whose assay is desired, may be used for the methods and in the devices of this invention, and represent an embodiment thereof.

In one embodiment, a device for use in such cellular analysis may comprise micromixers, micropumps, or a combination thereof. There are many conceivable means of placement of the micromixers and/or micropumps in a given device, their respective placement, will be a function of the assay to be conducted, the reagents introduced, the nature of the sample being assayed, etc., as will be appreciated by one skilled in the art.

In another embodiment, this invention provides a method of analyte detection or assay, comprising the steps of:

a. introducing a fluid comprising an analyte to a first inlet port of a microfluidic device, said microfluidic device comprising:
   i. one or more inlet ports, at least one outlet port and microfluidic channels in fluid communication with said ports, said channels comprising one or more micropumps, one or more micromixers, or a combination thereof, wherein:
      a. said micropumps comprise a passageway for transmitting said suspension and said reagent; a source providing an electric field in said microchannel; at least one conductor element that is placed in an orientation that is perpendicular to the axis of said electric field, at a location within or proximal to said microchannel, whereby interactions between said electric field and said at least one conductor element produce electro-osmotic flows so that said suspension and said reagent ale driven across said microfluidic channels; and
      b. said micromixers comprise a passageway for transmitting said suspension and said reagent; a source providing an electric field in said microfluidic channels; an array of conductor elements placed in an orientation that is perpendicular to the axis of said electric field, at a location within or proximal to said microfluidic channels, whereby interactions between said electric field and each conductor element produce electro-osmotic flows with varied trajectories, and said suspension and said reagent are driven across said microfluidic channels so that said suspension and said reagent are mixed in said microfluidic channels;
      c. said microchannels being coated with a reagent for the detection, assay, or combination thereof of said analyte; and detecting, analyzing, or a combination thereof, of said analyte.

Analyte refers in some embodiments, to any material whose detection or other analysis is desired, or in some embodiments, analyte refers to a molecule, upon interaction with another molecule, provides a means for detection or assay of the second molecule. For example, and in some embodiments, an analyte is a probe, which upon binding to a target molecule provides a means for the identification, assay, processing, or other manipulation, or the target molecule. In another embodiment, the analyte is the target molecule, which upon interaction with a probe, ligand, receptor, antibody, or other desired molecule, which in one embodiment, is coated on, or found within a microchannel of the device, may be detected, assayed, processed, or otherwise manipulated. One skilled in the art will readily appreciate the multitude of permutations and applications, which make use of the devices, methods, and/or principles of this invention, whereby electrokinetic flow causes a sample to circulate over a target, or vice versa, or, in other embodiments, whereby electrokinetic flow causes a sample to be mixed with a target, or vice versa. Some of these applications may find use in the development of biosensor and/or bioassay applications. In some embodiments of this invention, such applications include the ability to move fluids in a contained cavity for assays where this principle is useful, for example, in protein crystallization methods, and others, as will be understood by one skilled in the art.

In another embodiment, this invention provides a method of high-throughput, multi-step product formation, the method comprising the steps of:

a. introducing a first liquid comprising a precursor to a first inlet port of a microfluidic device;
b. introducing a reagent, catalyst, reactant, cofactor, or combination thereof to a second inlet port of said microfluidic device, said microfluidic device comprising:
   i. two or more inlet ports, at least one outlet port and microfluidic channels in fluid communication with said ports, said channels comprising one or more micropumps, one or more micromixers, or a combination thereof, wherein:
      said micropumps comprise a passageway for transmitting said suspension and said reagent; a source providing an electric field in said microchannel; at least one conductor element that is placed in an orientation that is perpendicular to the axis of said electric field, at a location within or proximal to said microchannel, whereby interactions between said electric field and said at least one conductor element produce electro-osmotic flows so that said suspension and said reagent are driven across said microfluidic channels; and
      said micromixers comprise a passageway for transmitting said suspension and said reagent; a source providing an electric field in said microfluidic channels; an array of conductor elements placed in an orientation that is perpendicular to the axis of said electric field, at a location within or proximal to said microfluidic channels, whereby interactions between said electric field and each conductor element produce electro-osmotic flows with varied trajectories, and said suspension and said reagent are driven across said microfluidic channels so that said suspension and said reagent are mixed in said microfluidic channels; and
c. collecting the product formed from an outlet port of said device.

In another embodiment, this invention provides a method of high-throughput, multi-step product formation, the method comprising the steps of:

a. introducing a first liquid comprising a precursor to a first inlet port of a microfluidic device;
b. introducing a second liquid comprising a reagent, catalyst, reactant, cofactor, or combination thereof to said first inlet port or a second inlet port of said microfluidic device, said microfluidic device comprising:
   i. one or more inlet ports, at least one outlet port and microfluidic channels in fluid communication with said ports, said channels comprising one or more micropumps, one or more micromixers, or a combination thereof, wherein:
      said micropumps comprise a passageway for transmitting said suspension and said reagent; a source providing an electric field in said microchannel; at least one conductor element that is placed in an orientation that is perpendicular to the axis of said electric field, at a location within or proximal to said microchannel, whereby interactions between said electric field and said at least one conductor element produce electro-osmotic flows so that said first liquid and said second liquid are driven across said microfluidic channels; and
      said micromixers comprise a passageway for transmitting said suspension and said reagent; a source providing an electric field in said microfluidic channels; at least one conductor element that is placed in an orientation that is perpendicular to the axis of said electric field, at a location within or proximal to said microchannel, whereby interactions between said electric field and each conductor element produce electro-osmotic flows with varied trajectories, and said first liquid and said second liquid are driven across said microfluidic channels so that said first liquid and said second liquid are mixed in said microfluidic channels; and
c. collecting said mixed liquid formed from an outlet port of said device.

In one embodiment, the method further comprises the step of carrying out iterative introductions of said second liquid, as in (b), to additional inlet ports. In one embodiment, the reagent is an antibody, a nucleic acid, an enzyme, a substrate, a ligand, a reactant or a combination thereof.

In another embodiment, this invention provides a method of drug processing and delivery, the method comprising the steps of:

a. introducing a first liquid comprising a drug to a first inlet port of a microfluidic device;
b. introducing a second liquid comprising a buffer, a catalyst, or combination thereof to said first inlet port or to a second inlet port of said microfluidic device, said microfluidic device comprising:
   i. two or more inlet ports, at least one outlet port and microfluidic channels in fluid communication with said ports, said channels comprising one or more micropumps, one or more micromixers, or a combination thereof, wherein:
      said micropumps comprise a passageway for transmitting said first and said second liquids; a source providing an electric field in said microchannel; at least one conductor element that is placed in an orientation that is perpendicular to the axis of said electric field, at a location within or proximal to said microchannel, whereby interactions between said electric field and said at least one conductor element produce electro-osmotic flows so that said first liquid and said second liquid are driven across said microfluidic channels; and
      said micromixers comprise a passageway for transmitting said first liquid and said second liquid; a source providing an electric field in said microfluidic-channels; one or more conductor elements placed in an orientation that is perpendicular to the axis of said electric field, at a location within or proximal to said microfluidic channels, whereby interactions between said electric field and each conductor element produce electro-osmotic flows with varied trajectories, and said first liquid and said second liquid are driven across said microfluidic channels so that said first liquid and said second liquid are mixed in said microfluidic channels; and c. delivering the product of (b) to a subject, through an outlet port of said device.

In one embodiment, the method further comprises carrying out iterative introductions of said second liquid to said inlet ports. In another embodiment, the second liquid serves to dilute the drug to a desired concentration.

In one embodiment, the method further comprises carrying out iterative introductions of reagent, catalyst, reactant, cofactor, or combination thereof as in (b) to additional inlet ports.

Metabolic processes and other chemical, processes can involve multiple steps of reactions of precursors with an enzyme, or catalyst, or mimetic, etc., in some embodiments, with or without the involvement of cofactors, in other embodiments, to obtain specific products, which in turn are reacted, to form additional products, etc. until a final desired product is obtained. In one embodiment, the devices and/or methods of this invention are used for such a purpose. In one embodiment, such methodology enables use of smaller quantitites of reagents, or precursors, which may be limiting, in other embodiments, such methodology enables isolation of highly reactive intermediates, which in turn may promote greater product formation. It will be apparent to one skilled in the art that a means for stepwise, isolated or controlled synthesis provides many advantages, and is amenable to any number of permutations.

It is to be understood that any of the embodiments described herein, with regards to samples, reagents and device embodiments are applicable with regard to any method as described herein, representing embodiments thereof.

In another embodiment, the induced-charge electroosmotic mixers of this invention are incorporated in a device, which in turn circulates solutions containing probe molecules over target surfaces. In one embodiment, the probe may be any molecule, which specifically interacts with a target molecule, such as, for example, a nucleic acid, an antibody, a ligand, a receptor, etc. In another embodiment, the probe will have a moiety which can be chemically cross-linked with the desired target molecule, with reasonable specificity, as will be appreciated by one skilled in the art. According to this aspect of the invention and in one embodiment, a microchannel of the device may be coated with a mixture, lysate, sample, etc., comprising a target molecule of interest.

In one embodiment, such a device provides an advantage in terms of the time needed for assay, the higher sensitivity of detection, lower concentration of sample/reagents needed, since the sample may be recirculated over the target surface, or combination thereof.

In another embodiment, this invention provides a method of drug processing and delivery, the method comprising the steps of:

a. introducing a first liquid comprising a drug to a first inlet port of a microfluidic device;

b. introducing a second liquid comprising a buffer, a catalyst, or combination thereof to said first inlet port or to a second inlet port of said microfluidic device, said microfluidic device comprising:

i. two or more inlet ports, at least one outlet port and microfluidic channels in fluid communication with said ports, said channels comprising one or more micropumps, one or more micromixers, or a combination thereof, wherein:

said micropumps comprise a passageway for transmitting said first and said second liquids; a source providing an electric field in said microchannel; at least one conductor element that is placed in an orientation that is perpendicular to the axis of said electric field, at a location within or proximal to said microchannel, whereby interactions between said electric field and said at least one conductor element produce electro-osmotic flows so that said first liquid and said second liquid are driven across said microfluidic channels; and said micromixers comprise a passageway for transmitting said first liquid and said second liquid; a source providing an electric field in said microfluidic channels; one or more conductor elements placed in an orientation that is perpendicular to the axis of said electric field, at a location within or proximal to said microfluidic channels, whereby interactions between said electric field and each conductor element produce electro-osmotic flows with varied trajectories, and said first liquid and said second liquid are driven across said microfluidic channels so that said first liquid and said second liquid are mixed in said microfluidic channels; and c. delivering the product of (b) to a subject, through an outlet port of said device.

In one embodiment, the method further comprises carrying out iterative introductions of said second liquid to said inlet ports. In another embodiment, the second liquid serves to dilute the drug to a desired concentration. In one embodiment, the device comprises valves, positioned to regulate fluid flow through the device, such as, for example, for regulating fluid flow through the outlet of the device, which in turn prevents depletion from the device, in one embodiment. In another embodiment, the positioning of valves provides an independent means of regulating fluid flow, apart from a relay from signals from the subject, which stimulate fluid flow through the device.

In another embodiment, this invention provides a device for use in drug delivery, wherein the device conveys fluid from a reservoir to an outlet port. In one embodiment, drug delivery according to this aspect of the invention, enables mixing of drug concentrations in the device, or altering the flow of the drug, or combination thereof, or in another embodiment, provides a means of continuous delivery. In one embodiment, such a device may be implanted in a subject, and provide drug delivery in situ. In one embodiment, such a device may be prepared so as to be suitable for transdermal drug delivery, as will be appreciated by one skilled in the art.

Although the present invention has been shown and described with respect to several preferred embodiments thereof, various changes, omissions and additions to the form and detail thereof, may be made therein, without departing from the spirit and scope of the invention.

EXAMPLES

Example 1

Device Comprising Multiple Induced-Charge Electro-Osmotically driven Microfluidic Mixers It is possible to create many permutations of a device comprising multiple induced-charge electro-osmotically driven microfluidic mixers or pumps, or a combination thereof, as will be appreciated by one skilled in the art, and as described hereinabove. One embodiment of such a device is a microfluidic two-stage mixer, as depicted in FIG. 1. The device will comprise inlet ports for the introduction of a sample, a reagent, a detecting moiety, a catalyst, or a combination thereof, or any agent whose introduction is desired. Such inlet ports may be constructed as depicted in the figure (1-10, 1-20, and 1-30). The inlet ports, in turn, may lead to channels (depicted at 1-40, 1-50, and 1-80 respectively, in the figure), which in this example serve to convey the introduced matter into another region of the device. Channels 1-40 and 1-50 may merge, for example as a Y-junction (1-60) and lead to a channel (1-70), which contains a nonlinear electrokinetic mixer, as described herein. In a two-step mixing process, for example, matter introduced into 2 channels are first mixed, and the mixture (from Channel 1-70) is then contacted with matter introduced into a third channel (1-80) at, for example, the Y-junction (1-90), which conveys both materials to channel 1-100, which contains a nonlinear electrokinetic mixer. Channel 1-100 connects to channel 1-110, which serves to convey the mixed product to outlet 1-120.

Example 2

Analysis of Cellular Components

It will be appreciated by one skilled in the art that the device described in Example 1 may be useful in a wide array of applications. In one application, for example analysis of expressed proteins or nucleic acids in a single cell, inlet 1-10 is used to introduce a single cell in a buffer solution into the device. It will be appreciated by one skilled in the art that the inlet will be so constructed as to facilitate entry of singular cells, which are then conveyed to channel 1-40. Inlet 1-20 conveys a lysing agent. The lysing agent mixes with the cell and buffer solution in 1-70, causing cell lysis, and release of cellular contents. Inlet 1-80 conveys a fluorescent-tagged probe or antibody which mixes with the cellular contents in 1-100, resulting in specific labeling of cellular components. It is also envisioned that wash solutions are introduced in the inlet following a period of time of exposure to the labeled agent, or, another inlet which conveys the solution may be constructed, whereby non-specific labeling may be diminished. Fluorescent detection may be carried out by imaging the material conveyed to channel 1-110. Again, it will be apparent to one skilled in the art, that the construction of the device will accommodate imaging of the appropriate channel, thus the material used for construction of at least this region of the device may be transparent.

Example 3

Figure 2:
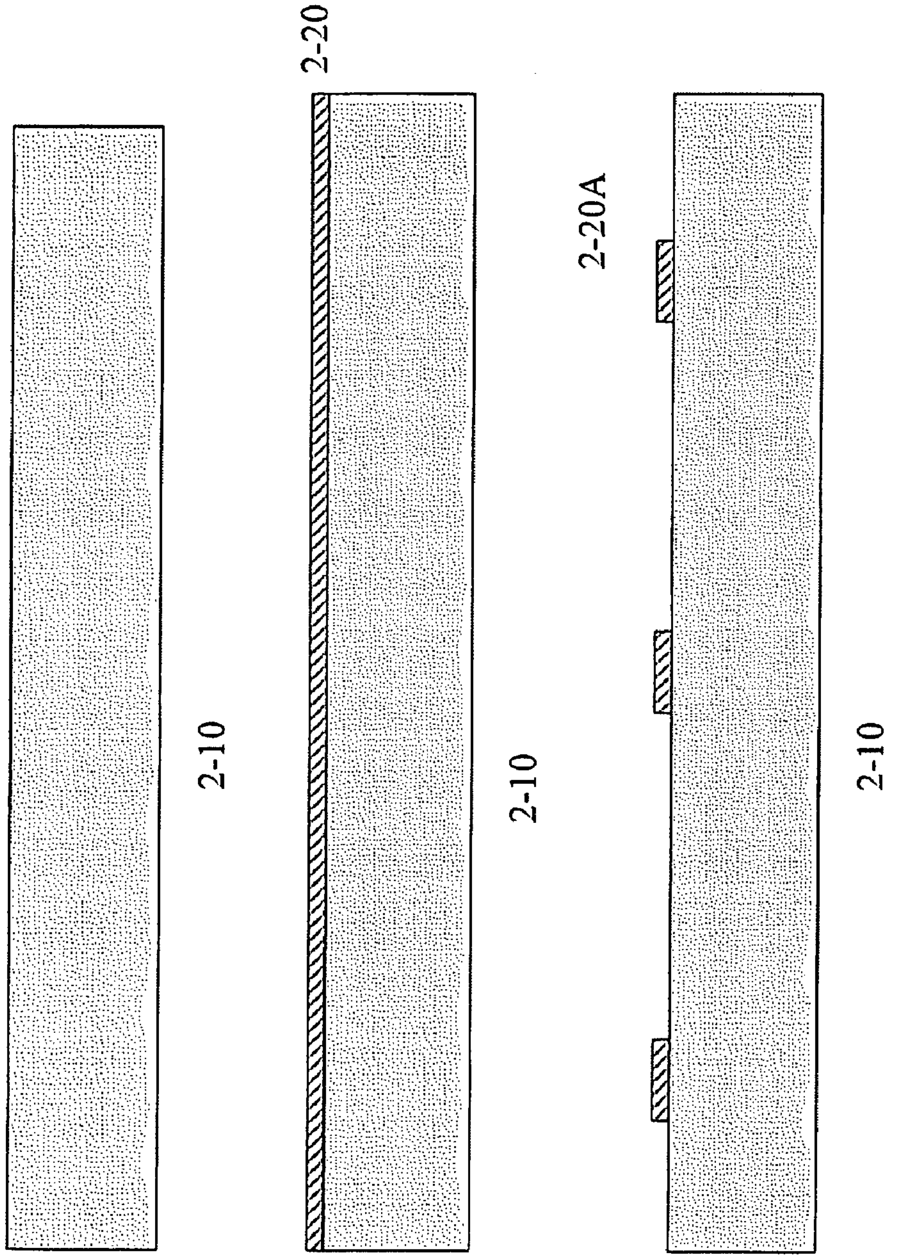
FIG. 2 schematically depicts an embodiment of a fabrication process for the device described in FIG. 1, labeled as section A-A.
Figure 2:
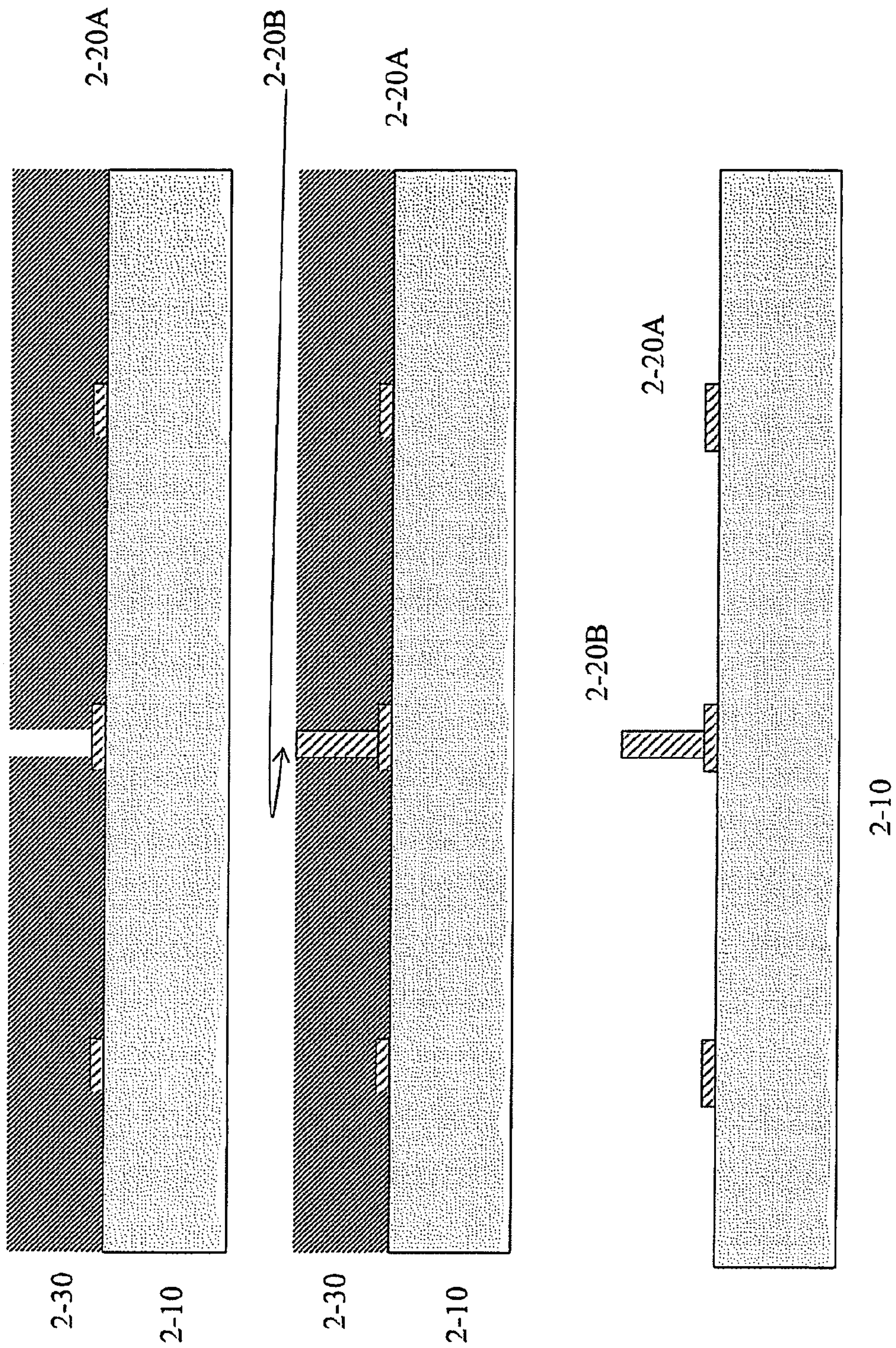
Figure 2:
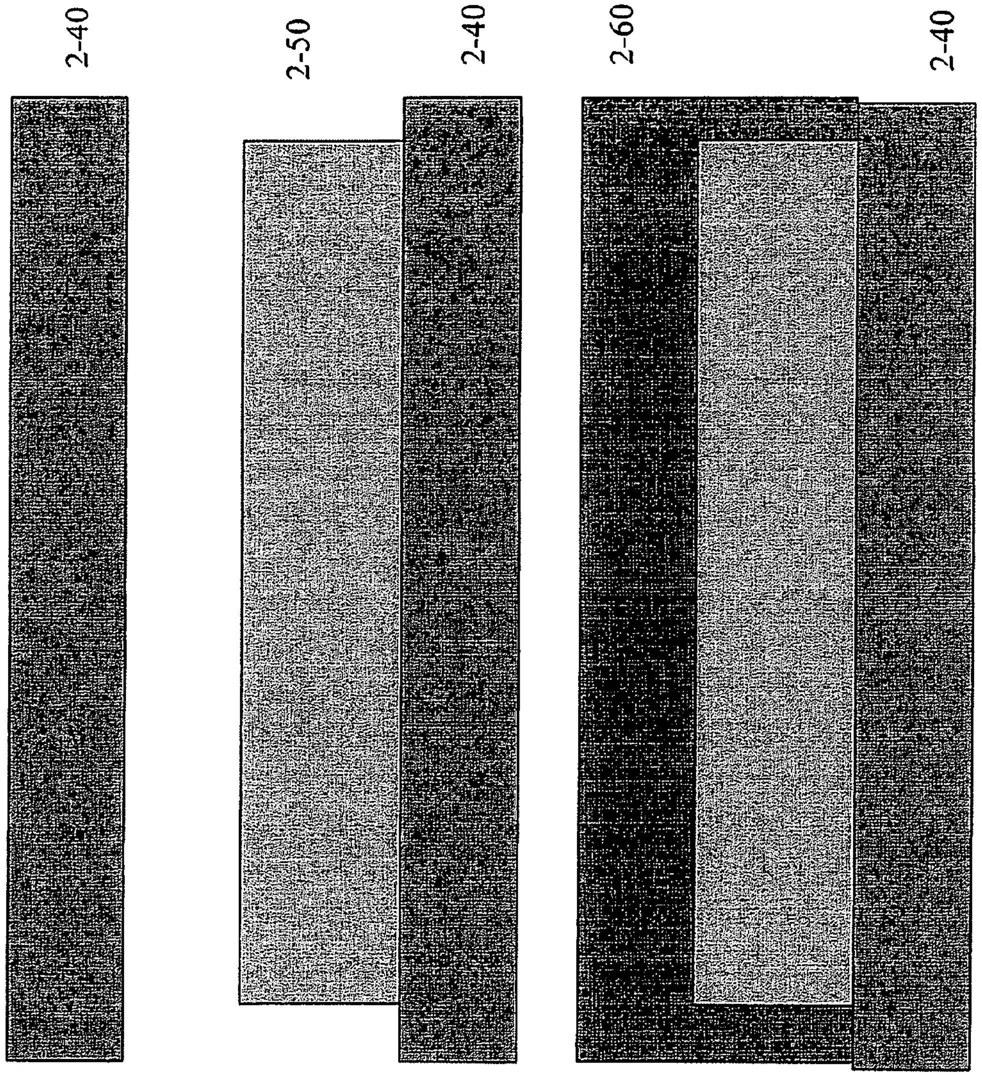
Figure 2:
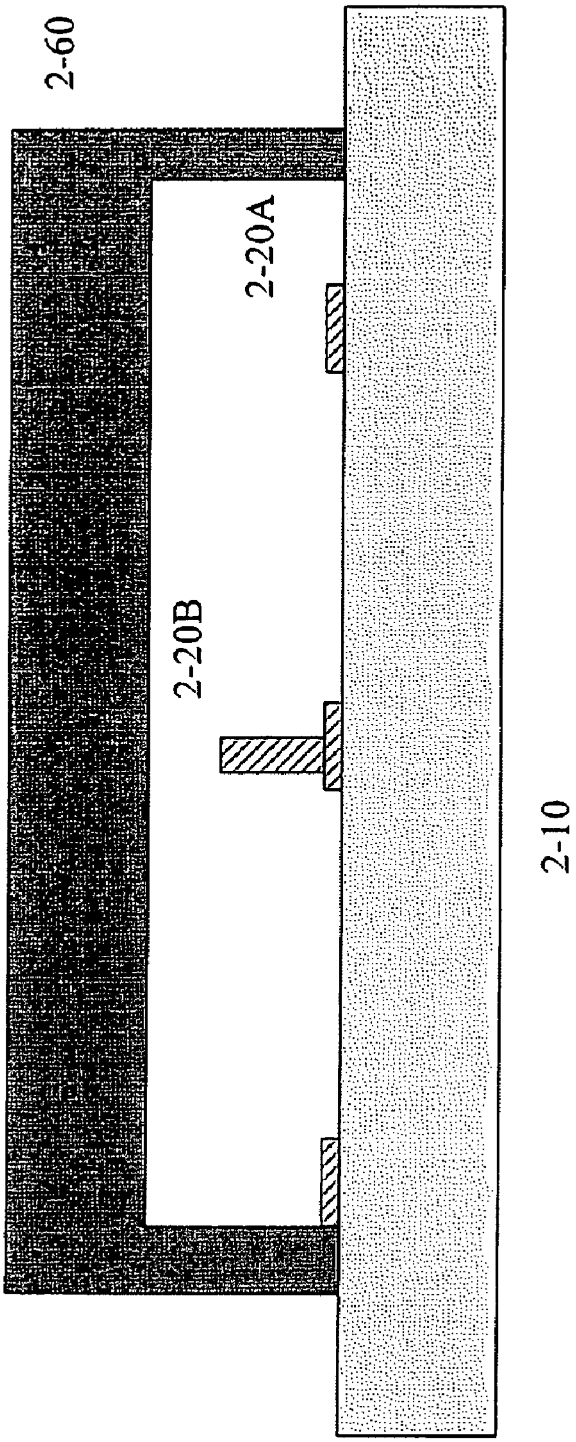

Construction of a Device Comprising Induced-Charge Electro-Osmotically Driven Microfluidic Mixers Many methods for fabricating devices as described herein will be apparent to one skilled in the art. One embodiment for such a means of construction is depicted in FIG. 2. The figure specifically describes fabrication of the device outlined in Example 1, FIG. 1, at the region of the device labeled as section A-A.

The starting substrate 2-10 is a 0.5 μm thick four-inch diameter double-side polished borofloat glass wafer. Substrate 2-10 is cleaned in 3:1 sulfuric acid:hydrogen peroxide to remove any organic material from the surface. The substrate 2-10 is then oxygen plasma ashed for 5 minutes to roughen the surface.

Following preparation of the substrate, a gold layer 2-20 is e-beam evaporated onto the substrate. Polymer photoresist is deposited onto the gold layer 2-20 and patterned using a chromium photomask. The patterned photoresist is then used as a masking material for a wet etch of gold layer 2-20A. Masking material 2-30 such as SU-8 epoxy-based photoresist is deposited onto substrate 2-10 and patterned. Gold structure 2-20B is electroplated into mold 2-30 and subsequently removed leaving an isolated metal post 2-20B. Substrate 2-40 is a sacrificial substrate for casting the fluidic channel. Photoresist material 2-50 is deposited and patterned on substrate 2-40. PDMS or similar polymer material is then cast onto pattern 2-50 forming channel 2-60. Channel 2-60 is peeled off of substrate 2-40 and used to form the channels on substrate 2-10.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A microfluidic device comprising one or more inlet ports, one or more outlet ports and microfluidic channels in fluid communication with said ports, said channels comprising one or more micropumps and one or more micromixers, wherein:

said micropumps comprise a passageway for transmitting an electrolyte fluid; a source providing an AC or pulsed AC electric field or pulsed AC electric field with a DC offset in said microchannel; at least one conductor element that is placed in an orientation that is perpendicular to the axis of said electric field, at a location within or proximal to said microchannel, whereby interactions between said field and said at least one conductor element produce electro-osmotic flows so that said electrolyte fluid is driven across said microfluidic channels; and said micromixers comprise a passageway for transmitting an electrolyte fluid; a source providing an AC or pulsed AC electric field or pulsed AC electric field with a DC offset in said microfluidic channel; at least one conductor element that is placed in an orientation that is perpendicular to the axis of said electric field, at a location within or proximal to said microchannel, whereby interactions between said field and said conductor element produce electro-osmotic flows with varied trajectories, and said electrolyte fluid is driven across said microfluidic channels so that said electrolyte fluid is mixed in said microfluidic channels.

2. The microfluidic device of claim 1, wherein said conductor element is comprised of a symmetric cylinder of a defined radius.

3. The microfluidic device of claim 2, wherein said radius ranges from about 5 to about 250 μm.

4. The microfluidic device of claim 1, wherein said conductor element is comprised of an asymmetric conductor element, with either non-uniform surface composition or non-circular cross section.

5. The microfluidic device of claim 4, wherein said conductor element is comprised of a conducting strip.

6. The microfluidic device of claim 5, wherein at least one wall of said microfluidic channels comprises said conducting strip.

7. The microfluidic device of claim 4, wherein the shape of said conductor element approximates an arrowhead, teardrop, or ellipse.

8. The microfluidic device of claim 1, wherein said microfluidic channels form a cross-junction, an elbow-junction, a T-junction, a Y-junction, or a combination thereof.

9. The microfluidic device of claim 1, wherein said conductor element is comprised of a symmetric conductor element.

10. The microfluidic device of claim 1, wherein said microfluidic channels are comprised of a transparent material.

11. The microfluidic device of claim 1, wherein said microfluidic channels are comprised of a metal.

12. The microfluidic device of claim 11, wherein said metal is a metal bilayer.

13. The microfluidic device of claim 12, wherein an exposed layer of said bilayer is functionalized to minimize adherence of material conveyed through said device.

14. The microfluidic device of claim 1, wherein said device comprises an array of conductor elements.

15. An apparatus comprising the microfluidic device of claim 1.

16. The microfluidic device from claim 1, wherein said device further comprises a center electrode.

17. A method of cellular analysis comprising the steps of:

a. introducing a buffered suspension comprising cells to a first inlet port of a microfluidic device;

b. introducing a reagent for cellular analysis to said first inlet or to a second inlet port of said microfluidic device, said microfluidic device comprising:

one or more inlet ports, at least one outlet port and microfluidic channels in fluid communication with said ports, said channels comprising one or more micropumps, one or more micromixers, or a combination thereof wherein:

a. said micropumps comprise a passageway for transmitting said suspension and said reagent; a source providing an AC or pulsed AC electric field or pulsed AC electric field with a DC offset in said microchannel; at least one conductor element that is placed in an orientation that is perpendicular to the axis of said electric field, at a location within or proximal to said microchannel, whereby interactions between said electric field and said at least one conductor element produce electro-osmotic flows so that said suspension and said reagent are driven across said microfluidic channels; and b. said micromixers comprise a passageway for transmitting said suspension and said reagent; a source providing an AC or pulsed AC electric field or pulsed AC electric field with a DC offset in said microfluidic channels; an array of conductor elements placed in an orientation that is perpendicular to the axis of said electric field, at a location within or proximal to said microfluidic channels, whereby interactions between said electric field and each conductor element produce electro-osmotic flows with varied trajectories, and said suspension and said reagent are driven across said microfluidic channels so that said suspension and said reagent are mixed in said microfluidic channels; and analyzing at least one parameter affected by contact between said suspension and said reagent.

18. The method of claim 17, wherein said reagent is an antibody, a nucleic acid, an enzyme, a substrate, a ligand, or a combination thereof.

19. The method of claim 18, wherein said reagent is coupled to a detectable marker.

20. The method of claim 19, wherein said marker is a fluorescent compound.

21. The method of claim 20, wherein said device is coupled to a fluorimeter or fluorescent microscope.

22. The method of claim 21, wherein said device is comprised of a transparent material.

23. The method of claim 17, further comprising the step of introducing a cellular lysis agent in an inlet port of said device.

24. The method of claim 23, wherein said reagent specifically interacts or detects an intracellular compound.

25. A method of high-throughput, multi-step product formation, the method comprising the steps of:

a. introducing a first liquid comprising a precursor to a first inlet port of a microfluidic device;

b. introducing a second liquid comprising a reagent, catalyst, reactant, cofactor, or combination thereof to a second inlet port of said microfluidic device, said microfluidic device comprising:

i. two or more inlet ports, at least one outlet port and microfluidic channels in fluid communication with said ports, said channels comprising one or more micropumps, one or more micromixers, or a combination thereof wherein:

said micropumps comprise a passageway for transmitting said suspension and said reagent; a source providing an AC or pulsed AC electric field or pulsed AC electric field with a DC offset in said microchannel; at least one conductor element that is placed in an orientation that is perpendicular to the axis of said electric field, at a location within or proximal to said microchannel, whereby interactions between said electric field and said at least one conductor element produce electro-osmotic flows so that said first liquid and said second liquid are driven across said microfluidic channels; and said micromixers comprise a passageway for transmitting said suspension and said reagent; a source providing an AC or pulsed AC electric field or pulsed AC electric field with a DC offset in said microfluidic channels; at least one conductor element that is placed in an orientation that is perpendicular to the axis of said electric field, at a location within or proximal to said microchannel, whereby interactions between said electric field and each conductor element produce electro-osmotic flows with varied trajectories, and said first liquid and said second liquid are driven across said microfluidic channels so that said first liquid and said second liquid are mixed in said microfluidic channels; and c. collecting said mixed liquid from an outlet port of said device.

26. The method of claim 25, further comprising carrying out iterative introductions of said second liquid, as in (b), to additional inlet ports.

27. The method of claim 25, wherein said reagent is an antibody, a nucleic acid, an enzyme, a substrate, a ligand, a reactant or a combination thereof 28. A method of drug processing and delivery, the method comprising the steps of:

a. introducing a first liquid comprising a drug to a first inlet port of a microfluidic device;

b. introducing a second liquid comprising a buffer, a catalyst, or combination thereof to said first inlet port or to a second inlet port of said microfluidic device, said microfluidic device comprising:

i. two or more inlet ports, at least one outlet port and microfluidic channels in fluid communication with said ports, said channels comprising one or more micropumps, one or more micromixers, or a combination thereof wherein:

said micropumps comprise a passageway for transmitting said first and said second liquids; a source providing an electric field in said microchannel; at least one conductor element that is placed in an orientation that is perpendicular to the axis of said electric field, at a location within or proximal to said microchannel, whereby interactions between said electric field and said at least one conductor element produce electro-osmotic flows so that said first liquid and said second liquid are driven across said microfluidic channels; and said micromixers comprise a passageway for transmitting said first liquid and said second liquid; a source providing an electric field in said microfluidic channels; one or more conductor elements placed in an orientation that is perpendicular to the axis of said electric field, at a location within or proximal to said microfluidic channels, whereby interactions between said electric field and each conductor element produce electro-osmotic flows with varied trajectories, and said first liquid and said second liquid are driven across said microfluidic channels so that said first liquid and said second liquid are mixed in said microfluidic channels; and c. delivering the product of (b) to a subject, through an outlet port of said device.

29. The method of claim 28, further comprising carrying out iterative introductions of said second liquid to said inlet ports.

30. The method of claim 28, wherein introduction of said second liquid serves to dilute said drug to a desired concentration.

31. A method of analyte detection or assay, comprising the steps of:

a. introducing a fluid comprising an analyte to a first inlet port of a microfluidic device, said microfluidic device comprising:

i. one or more inlet ports, at least one outlet port and microfluidic channels in fluid communication with said ports, said channels comprising one or more micropumps and one or more micromixers, wherein:

a. said micropumps comprise a passageway for transmitting said suspension and said reagent; a source providing an AC or pulsed AC electric field or pulsed AC electric field with a DC offset in said microchannel; at least one conductor element that is placed in an orientation that is perpendicular to the axis of said electric field, at a location within or proximal to said microchannel, whereby interactions between said electric field and said at least one conductor element produce electro-osmotic flows so that said suspension and said reagent are driven across said microfluidic channels; and b. said micromixers comprise a passageway for transmitting said suspension and said reagent; a source providing an AC or pulsed AC electric field or pulsed AC electric field with a DC offset in said microfluidic channels; an array of conductor elements placed in an orientation that is perpendicular to the axis of said electric field, at a location within or proximal to said microfluidic channels, whereby interactions between said electric field and each conductor element produce electro-osmotic flows with varied trajectories, and said suspension and said reagent are driven across said microfluidic channels so that said suspension and said reagent are mixed in said microfluidic channels;

c. said microchannels being coated with a reagent for the detection, assay, or combination thereof of said analyte; and detecting, analyzing, or a combination thereof, of said analyte.

32. The microfluidic device of claim 31, wherein said device further comprises a center electrode.

33. The microfluidic device of claim 31, wherein said device comprises obstacles in said channels, which impede or change fluid flow in said channels.

34. A microfluidic device comprising one or more inlet ports, one or more outlet ports and microfluidic channels in fluid communication with said ports, said channels comprising one or more micropumps, one or more micromixers, or a combination thereof, wherein:

said micropumps comprise a passageway for transmitting an electrolyte fluid; a source providing a DC electric field in said microchannel; at least one conductor element comprised of a symmetric cylinder of a defined radius that is placed in an orientation that is perpendicular to the axis of said electric field, at a location within or proximal to said microchannel, whereby interactions between said field and said at least one conductor element produce electro-osmotic flows so that said electrolyte fluid is driven across said microfluidic channels; and said micromixers comprise a passageway for transmitting an electrolyte fluid; a source providing a DC electric field in said microfluidic channel; at least one conductor element comprised of a symmetric cylinder of a defined radius that is placed in an orientation that is perpendicular to the axis of said electric field, at a location within or proximal to said microchannel, whereby interactions between said field and said conductor element produce electro-osmotic flows with varied trajectories, and said electrolyte fluid is driven across said microfluidic channels so that said electrolyte fluid is mixed in said microfluidic channels.

35. The microfluidic device of claim 34, wherein said field source is comprised of electrodes of different polarities.

36. The microfluidic device of claim 34, wherein said radius ranges from about 5 to about 250 μm.

37. The microfluidic device of claim 34, wherein said microfluidic channels form a cross-junction, an elbow-junction, a T-junction, a Y-junction, or a combination thereof.

38. The microfluidic device of claim 34, wherein said microfluidic channels are comprised of a transparent material.

39. The microfluidic device of claim 35, wherein said microfluidic channels are comprised of a metal.

40. The microfluidic device of claim 39, wherein said metal is a metal bilayer.

41. The microfluidic device of claim 40, wherein an exposed layer of said bilayer is functionalized to minimize adherence of material conveyed through said device.

42. The microfluidic device of claim 34, wherein said device comprises an away of conductor elements.

43. An apparatus comprising the microfluidic device of claim 34.

44. A method of cellular analysis comprising the steps of:

a. introducing a buffered suspension comprising cells to a first inlet port of a microfluidic device;

b. introducing a reagent for cellular analysis to said first inlet or to a second inlet port of said microfluidic device, said microfluidic device comprising:

i. one or more inlet ports, at least one outlet port and microfluidic channels in fluid communication with said ports, said channels comprising one or more micropumps, one or more micromixers, or a combination thereof, wherein:

a. said micropumps comprise a passageway for transmitting said suspension and said reagent; a source providing a DC electric field in said microchannel; at least one conductor element comprised of a symmetric cylinder of a defined radius that is placed in an orientation that is perpendicular to the axis of said electric field, at a location within or proximal to said microchannel, whereby interactions between said electric field and said at least one conductor element produce electro-osmotic flows so that said suspension and said reagent are driven across said microfluidic channels; and b. said micromixers comprise a passageway for transmitting said suspension and said reagent; a source providing a DC electric field in said microfluidic channels; an anay of conductor elements comprised of symmetric cylinders of a defined radius placed in an orientation that is perpendicular to the axis of said electric field, at a location within or proximal to said microfluidic channels, whereby interactions between said electric field and each conductor element produce electro-osmotic flows with varied trajectories, and said suspension and said reagent are driven across said microfluidic channels so that said suspension and said reagent are mixed in said microfluidic channels; and analyzing at least one parameter affected by contact between said suspension and said reagent.

45. The method of claim 44, wherein said reagent is an antibody, a nucleic acid, an enzyme, a substrate, a ligand, or a combination thereof 46. The method of claim 45, wherein said reagent is coupled to a detectable marker.

47. The method of claim 45, wherein said device is coupled to a fluorimeter or fluorescent microscope.

48. The method of claim 44, wherein said marker is a fluorescent compound.

49. The method of claim 44, wherein said device is comprised of a transparent material.

50. The method of claim 44, further comprising the step of introducing a cellular lysis agent in an inlet port of said device.

51. The method of claim 50, wherein said reagent specifically interacts or detects an intracellular compound.

52. A method of high-throughput, multi-step product formation, the method comprising the steps of:

a. introducing a first liquid comprising a precursor to a first inlet port of a microfluidic device;

b. introducing a second liquid comprising a reagent, catalyst, reactant, cofactor, or combination thereof to a second inlet port of said microfluidic device, said microfluidic device comprising:

i. two or more inlet ports, at least one outlet port and microfluidic channels in fluid communication with said ports, said channels comprising one or more micropumps, one or more micromixers, or a combination thereof, wherein:

said micropumps comprise a passageway for transmitting said suspension and said reagent; a source providing a DC electric field in said microchannel; at least one conductor element comprised of a symmetric cylinder of a defined radius that is placed in an orientation that is perpendicular to the axis of said electric field, at a location within or proximal to said microchannel, whereby interactions between said electric field and said at least one conductor element produce electro-osmotic flows so that said first liquid and said second liquid are driven across said microfluidic channels; and said micromixers comprise a passageway for transmitting said suspension and said reagent; a source providing an electric field in said microfluidic channels; at least one conductor element comprised of a symmetric cylinder of a defined radius that is placed in an orientation that is perpendicular to the axis of said electric field, at a location within or proximal to said microchannel, whereby interactions between said electric field and each conductor element produce electro-osmotic flows with varied trajectories, and said first liquid and said second liquid are driven across said microfluidic channels so that said first liquid and said second liquid are mixed in said microfluidic channels; and c. collecting said mixed liquid from an outlet port of said device.

53. The method of claim 52, further comprising carrying out iterative introductions of said second liquid, as in (b), to additional inlet ports.

54. The method of claim 52, wherein said reagent is an antibody, a nucleic acid, an enzyme, a substrate, a ligand, a reactant or a combination thereof.

55. A method of analyte detection or assay, comprising the steps of:

a. introducing a fluid comprising an analyte to a first inlet port of a microfluidic device, said microfluidic device comprising:

i. one or more inlet ports, at least one outlet port and microfluidic channels in fluid communication with said ports, said channels comprising one or more micropumps, one or more micromixers, or a combination thereof wherein:

said micropumps comprise a passageway for transmitting said suspension and said reagent; a source providing a DC electric field in said microchannel; at least one conductor element comprised of a symmetric cylinder of a defined radius that is placed in an orientation that is perpendicular to the axis of said electric field, at a location within or proximal to said microchannel, whereby interactions between said electric field and said at least one conductor element produce electro-osmotic flows so that said suspension and said reagent are driven across said microfluidic channels; and said micromixers comprise a passageway for transmitting said suspension and said reagent; a source providing an electric field in said microfluidic channels; an array of conductor elements comprised of symmetric cylinders of a defined radius placed in an orientation that is perpendicular to the axis of said electric field, at a location within or proximal to said microfluidic channels, whereby interactions between said electric field and each conductor element produce electro-osmotic flows with varied trajectories, and said suspension and said reagent are driven across said microfluidic channels so that said suspension and said reagent are mixed in said microfluidic channels;

said microchannels being coated with a reagent for the detection, assay, or combination thereof of said analyte; and detecting, analyzing, or a combination thereof, of said analyte.

56. A microfluidic device comprising one or more inlet ports, one or more outlet ports and microfluidic channels in fluid communication with said ports, said channels comprising one or more micropumps and one or more micromixers, wherein:

said micropumps comprise a passageway for transmitting an electrolyte fluid; a source providing a DC electric field in said microchannel; at least one conductor element comprised of an asymmetric conductor element, with either non-uniform surface composition or non-circular cross section that is placed in an orientation that is perpendicular to the axis of said electric field, at a location within or proximal to said microchannel, whereby interactions between said field and said at least one conductor element produce electro-osmotic flows so that said electrolyte fluid is driven across said microfluidic channels; and said micromixers comprise a passageway for transmitting an electrolyte fluid; a source providing a DC electric field in said microfluidic channel; at least one conductor element comprised of an asymmetric conductor element, with either non-uniform surface composition or non-circular cross section that is placed in an orientation that is perpendicular to the axis of said electric field, at a location within or proximal to said microchannel, whereby interactions between said field and said conductor element produce electro-osmotic flows with varied trajectories, and said electrolyte fluid is driven across said microfluidic channels so that said electrolyte fluid is mixed in said microfluidic channels.

57. The microfluidic device of claim 56, wherein said field source is comprised of electrodes of different polarities.

58. The microfluidic device of claim 56, wherein said conductor element is comprised of a conducting strip.

59. The microfluidic device of claim 58, wherein at least one wall of said microfluidic channels comprises said conducting strip.

60. The microfluidic device of claim 56, wherein the shape of said conductor element approximates an arrowhead, teardrop, or ellipse.

61. The microfluidic device of claim 56, wherein said microfluidic channels form a cross-junction, an elbow-junction, a T-junction, a Y-junction, or a combination thereof.

62. The microfluidic device of claim 56, wherein said microfluidic channels are comprised of a transparent material.

63. The microfluidic device of claim 56, wherein said microfluidic channels are comprised of a metal.

64. The microfluidic device of claim 63, wherein said metal is a metal bilayer.

65. The microfluidic device of claim 64, wherein an exposed layer of said bilayer is functionalized to minimize adherence of material conveyed through said device.

66. The microfluidic device of claim 56, wherein said device comprises an away of conductor elements.

67. An apparatus comprising the microfluidic device of claim 56.

68. The microfluidic device of claim 56, wherein said device further comprises a center electrode.

69. A method of cellular analysis comprising the steps of:

a. introducing a buffered suspension comprising cells to a first inlet port of a microfluidic device;

b. introducing a reagent for cellular analysis to said first inlet or to a second inlet port of said microfluidic device, said microfluidic device comprising:

i. one or more inlet ports, at least one outlet port and microfluidic channels in fluid communication with said ports, said channels comprising one or more micropumps, one or more micromixers, or a combination thereof, wherein:

a. said micropumps comprise a passageway for transmitting said suspension and said reagent; a source providing a DC electric field in said microchannel; at least one conductor element comprised of an asymmetric conductor element, with either non-uniform surface composition or non-circular cross section that is placed in an orientation that is perpendicular to the axis of said electric field, at a location within or proximal to said microchannel, whereby interactions between said electric field and said at least one conductor element produce electro-osmotic flows so that said suspension and said reagent are driven across said microfluidic channels; and b. said micromixers comprise a passageway for transmitting said suspension and said reagent; a source providing a DC electric field in said microfluidic channels; an anay of conductor elements comprised of asymmetric conductor elements, with either non-uniform surface composition or non-circular cross section placed in an orientation that is perpendicular to the axis of said electric field, at a location within or proximal to said microfluidic channels, whereby interactions between said electric field and each conductor element produce electro-osmotic flows with varied trajectories, and said suspension and said reagent are driven across said microfluidic channels so that said suspension and said reagent are mixed in said microfluidic channels; and analyzing at least one parameter affected by contact between said suspension and said reagent.

70. The method of claim 69, wherein said reagent is an antibody, a nucleic acid, an enzyme, a substrate, a ligand, or a combination thereof.

71. The method of claim 70, wherein said reagent is coupled to a detectable marker.

72. The method of claim 69, wherein said marker is a fluorescent compound.

73. The method of claim 72, wherein said device is coupled to a fluorimeter or fluorescent microscope.

74. The method of claim 73, wherein said device is comprised of a transparent material.

75. The method of claim 69, further comprising the step of introducing a cellular lysis agent in an inlet port of said device.

76. The method of claim 75, wherein said reagent specifically interacts or detects an intracellular compound.

77. A method of high-throughput, multi-step product formation, the method comprising the steps of:

a. introducing a first liquid comprising a precursor to a first inlet port of a microfluidic device;

b. introducing a second liquid comprising a reagent, catalyst, reactant, cofactor, or combination thereof to a second inlet port of said microfluidic device, said microfluidic device comprising:

i. two or more inlet ports, at least one outlet port and microfluidic channels in fluid communication with said ports, said channels comprising one or more micropumps, one or more micromixers, or a combination thereof, wherein:

said micropumps comprise a passageway for transmitting said suspension and said reagent; a source providing a DC electric field in said microchannel; at least one conductor element comprised of an asymmetric conductor element, with either non-uniform surface composition or non-circular cross section that is placed in an orientation that is perpendicular to the axis of said electric field, at a location within or proximal to said microchannel, whereby interactions between said electric field and said at least one conductor element produce electro-osmotic flows so that said first liquid and said second liquid are driven across said microfluidic channels; and said micromixers comprise a passageway for transmitting said suspension and said reagent; a source providing a DC electric field in said microfluidic channels; at least one conductor element comprised of an asymmetric conductor element, with either non-uniform surface composition or non-circular cross section that is placed in an orientation that is perpendicular to the axis of said electric field, at a location within or proximal to said microchannel, whereby interactions between said electric field and each conductor element produce electro-osmotic flows with varied trajectories, and said first liquid and said second liquid are driven across said microfluidic channels so that said first liquid and said second liquid are mixed in said microfluidic channels; and c. collecting said mixed liquid from an outlet port of said device.

78. The method of claim 77, further comprising carrying out iterative introductions of said second liquid, as in (b), to additional inlet ports.

79. The method of claim 77, wherein said reagent is an antibody, a nucleic acid, an enzyme, a substrate, a ligand, a reactant or a combination thereof.

80. A method of analyte detection or assay, comprising the steps of:

a. introducing a fluid comprising an analyte to a first inlet port of a microfluidic device, said microfluidic device comprising:

i. one or more inlet ports, at least one outlet port and microfluidic channels in fluid communication with said ports, said channels comprising one or more micropumps, one or more micromixers, or a combination thereof wherein:

a. said micropumps comprise a passageway for transmitting said suspension and said reagent; a source providing a DC electric field in said microchannel; at least one conductor element comprised of an asymmetric conductor element, with either non-uniform surface composition or non-circular cross section that is placed in an orientation that is perpendicular to the axis of said electric field, at a location within or proximal to said microchannel, whereby interactions between said electric field and said at least one conductor element produce electro-osmotic flows so that said suspension and said reagent are driven across said microfluidic channels; and b. said micromixers comprise a passageway for transmitting said suspension and said reagent; a source providing a DC electric field in said microfluidic channels; an anay of conductor elements comprised of asymmetric conductor elements, with either non-uniform surface composition or non-circular cross section placed in an orientation that is perpendicular to the axis of said electric field, at a location within or proximal to said microfluidic channels, whereby interactions between said electric field and each conductor element produce electro-osmotic flows with varied trajectories, and said suspension and said reagent are driven across said microfluidic channels so that said suspension and said reagent are mixed in said microfluidic channels;

c. said microchannels being coated with a reagent for the detection, assay, or combination thereof of said analyte; and detecting, analyzing, or a combination thereof, of said analyte.

81. The microfluidic device of claim 1, wherein said device further comprises a center electrode.

82. The microfluidic device of claim 1, A microfluidic device comprising one or more inlet ports, one or more outlet ports and microfluidic channels in fluid communication with said ports, said channels comprising one or more micropumps and one or more micromixers, wherein:

said micropumps comprise a passageway for transmitting an electrolyte fluid: a source providing an AC or pulsed AC electric field or pulsed AC electric field with a DC offset in said microchannel: at least one conductor element that is placed in an orientation that is perpendicular to the axis of said electric field, at a location within or proximal to said microchannel, whereby interactions between said field and said at least one conductor element produce electro-osmotic flows so that said electrolyte fluid is driven across said microfluidic channels: and said micromixers comprise a passageway for transmitting an electrolyte fluid: a source providing an AC or pulsed AC electric field or pulsed AC electric field with a DC offset in said microfluidic channel: at least one conductor element that is placed in an orientation that is perpendicular to the axis of said electric field, at a location within or proximal to said microchannel, whereby interactions between said field and said conductor element produce electro-osmotic flows with varied trajectories. and said electrolyte fluid is driven across said microfluidic channels so that said electrolyte fluid is mixed in said microfluidic channels wherein said device comprises obstacles in said channels, which impede or change fluid flow in said channels.

* * * * *

UNITED STATES PATENT AND TRADEMARK OFFICE

CERTIFICATE OF CORRECTION

PATENT NO. : 7,691,244 B2
APPLICATION NO. : 11/252871
DATED : April 6, 2010
INVENTOR(S) : Levitan et al.

It is certified that error appears in the above-identified patent and that said Letters Patent is hereby corrected as shown below:

Please replace the following sponsorship Information at column 1, line 18 of the issued patent:

--This invention was made with government support under Grant No. DAAD19-02-D-0002 awarded by the ARO. The government has certain rights in this invention.--

Signed and Sealed this
Twenty-sixth Day of April, 2011

David J. Kappos
*Director of the United States Patent and Trademark Office*